(12) United States Patent
Han et al.

(10) Patent No.: US 7,610,123 B2
(45) Date of Patent: Oct. 27, 2009

(54) VISION-AIDED SYSTEM AND METHOD FOR GUIDING A VEHICLE

(75) Inventors: Shufeng Han, Johnston, IA (US); John Franklin Reid, Moline, IL (US); Francisco Rovira-Más, Benifayo (ES)

(73) Assignee: Deere & Company, Moline, IL (US)

( * ) Notice: Subject to any disclaimer, the term of this patent is extended or adjusted under 35 U.S.C. 154(b) by 700 days.

(21) Appl. No.: 11/106,782

(22) Filed: Apr. 15, 2005

(65) Prior Publication Data

US 2006/0149472 A1 Jul. 6, 2006

Related U.S. Application Data

(60) Provisional application No. 60/641,240, filed on Jan. 4, 2005.

(51) Int. Cl.
*G06F 7/70* (2006.01)
*G05D 1/08* (2006.01)
*G01C 22/00* (2006.01)

(52) U.S. Cl. .................. 701/14; 701/7; 701/23

(58) Field of Classification Search .......... 701/23, 701/28, 50, 214
See application file for complete search history.

(56) References Cited

U.S. PATENT DOCUMENTS

| | | | | |
|---|---|---|---|---|
| 5,341,142 A * | 8/1994 | Reis et al. | ...... | 342/64 |
| 5,684,476 A | 11/1997 | Anderson | ...... | 340/988 |
| 5,899,956 A * | 5/1999 | Chan | ...... | 701/213 |
| 5,955,973 A | 9/1999 | Anderson | ...... | 340/988 |
| 5,956,250 A * | 9/1999 | Gudat et al. | ...... | 701/26 |
| 6,094,625 A | 7/2000 | Ralston | | |
| 6,278,918 B1 | 8/2001 | Dickson et al. | | |
| 6,285,930 B1 | 9/2001 | Dickson et al. | | |
| 6,385,515 B1 * | 5/2002 | Dickson et al. | ...... | 701/28 |
| 6,405,132 B1 | 6/2002 | Breed et al. | | |
| 6,408,226 B1 | 6/2002 | Byrne et al. | | |
| 6,445,983 B1 * | 9/2002 | Dickson et al. | ...... | 701/23 |
| 6,526,352 B1 | 2/2003 | Breed et al. | | |
| 6,604,049 B2 | 8/2003 | Yokota | | |
| 6,687,571 B1 | 2/2004 | Byrne et al. | | |
| 6,697,724 B2 | 2/2004 | Beck | ...... | 701/50 |
| 6,760,654 B2 | 7/2004 | Beck | ...... | 701/50 |
| 2002/0057340 A1 | 5/2002 | Fernandez et al. | | |
| 2002/0105428 A1 | 8/2002 | Benson et al. | ...... | 340/635 |

(Continued)

OTHER PUBLICATIONS

Foessel-Bunting A, Bares J, and Whittaker W. Three-Dimensional Map Building With MMW Radar [online], [retrieved on Apr. 15, 2005]. Retrieved from the Internet:<URL:www.ri.cmu.edu/pubs/pub_3758.text.html>.

(Continued)

*Primary Examiner*—Mark Hellner
*Assistant Examiner*—Helal A Algahaim

(57) ABSTRACT

A method and system for guiding a vehicle comprises a location determining receiver for collecting location data for the vehicle. A vision module collects vision data for the vehicle. A location quality estimator estimates the location quality data for the location data during an evaluation time window. A vision module estimates vision quality data for the vision data during the evaluation time window. A supervisor module selects at least one of a location data weight and a vision data weight based on the quality data.

18 Claims, 11 Drawing Sheets

U.S. PATENT DOCUMENTS

| | | | |
|---|---|---|---|
| 2002/0106108 A1 | 8/2002 | Benson et al. | 382/104 |
| 2004/0158366 A1 | 8/2004 | Dieterle | |
| 2005/0060069 A1 | 3/2005 | Breed et al. | |
| 2005/0134440 A1 | 6/2005 | Breed | |
| 2005/0195383 A1 | 9/2005 | Breed et al. | |
| 2005/0254727 A1* | 11/2005 | Fedorovskaya | 382/286 |
| 2005/0278098 A1 | 12/2005 | Breed | |
| 2007/0052950 A1 | 3/2007 | Taylor et al. | |

OTHER PUBLICATIONS

Welch G and Bishop G. Scaat: Incremental Tracking with Incomplete Information. International Conference on Computer Graphics and Interactive Techniques [online], Aug. 1997 [retrieved on Apr. 15, 2005]. Retrieved from the Internet:<URL:www.cs.unc.edu/~welch/publications.html>.

Roth S and Singh S. Application of Robust, High-Accuracy Positioning for Autonomous Ground Vehicles [online], Aug. 2004 [retrieved on Apr. 15, 2005]. Retrieved from the Internet:<URL:www.ri.cmu.edu/pubs/pub_4804_text.html>.

Wagner M, O'Hallaron D. Apostolopoulos D, and Urmson C. Principles of Computer System Design for Stereo Perception [online], Jan. 17, 2002 [retrieved on Apr. 15, 2005]. Retrieved from the Internet:<URL:frc.ri.cmu.edu/~mwagner/publications/18_980_final_report.pdf>.

Chatterji, G.B.; Menon, P.K.; and Sridhar, B. *GPS/Machine Vision Navigation System for Aircraft*. IEEE Transactions on Aerospace and Electronic Ssytems, vol. 33, No. 3 (Jul. 1997), pp. 1012-1025.

Guo, L.S.; Zhang, Q.; and Feng, L. *A Low-Cost Integrated Positioning System of GPS and Inertial Sensors for Autonomous Agricultural Vehicles*. ASAE Meeting Paper No. 033112 (Jul. 27-30, 2003).

Han, S.; Zhang, Q.; and Noh, H.K. *Applying Filtering Techniques to Improve GPS Positioning Accuracy*. ASAE Meeting Paper No. 01-1158 (Jul. 30-Aug. 1, 2001).

Noguchi, N.; Reid, J.F.; Will, J.; Benson, E.R.; and Stombaugh, T.S. *Vehicle Automation System Based on Multi-Sensor Integration*. ASAE Meeting Paper No. 983111 (1998).

You, S. and Neumann, U. *Fusion of Vision and Gyro Tracking for Robust Augmented Reality Registration*. In Proc. IEEE Virtual Reality, (2001) pp. 71-78.

Internaional Search Report and Written Opinion of the International Searching Authority dated Sep. 25, 2007.

* cited by examiner

S400 — IDENTIFY A RELATIONSHIP (E.G., QUALITY-MIXING RELATIONSHIP OR RULE) BASED ON THE RESPECTIVE INPUT VALUES (E.G., QUALITY LEVELS OR LINGUISTIC VALUES) ASSOCIATED WITH VISION QUALITY DATA, LOCATION QUALITY DATA, AND CURVATURE.

S402 — DETERMINE OUTPUT VALUES (E.G., NUMERICAL OUTPUT VALUES) ASSOCIATED WITH THE LOCATION DATA WEIGHT, THE VISION DATA WEIGHT, OR CURVATURE DATA WEIGHT FOR THE IDENTIFIED ERROR CONTROL SIGNALS AND CURVATURE BASED ON THE IDENTIFIED RELATIONSHIP.

S502 — GENERATE AN ERROR CONTROL SIGNAL FOR STEERING THE VEHICLE IN ACCORDANCE WITH THE FOLLOWING EQUATIONS:

$$y = \alpha_{vision} \times y_{vision} + \alpha_{gps} \times y_{gps}$$
$$(y_{vision} + \alpha_{gps} = 1)$$

WHERE $y$ IS THE ERROR CONTROL SIGNAL, $\alpha_{vision}$ IS THE VISION DATA WEIGHT, $y_{vision}$ IS THE ERROR CONTROL SIGNAL FROM VISION DATA, $\alpha_{gps}$ IS THE LOCATION DATA WEIGHT, $y_{gps}$ IS THE ERROR CONTROL SIGNAL FROM LOCATION DATA,

AND $$\rho = \alpha_{vision,\rho} \times \rho_{vision} + \alpha_{gps,\rho} \times \rho_{gps}$$
$$(\alpha_{vision,\rho} + \alpha_{gps,\rho} = 1)$$

WHERE $\rho$ IS THE CURVATURE, $\rho_{vision}$ IS THE CURVATURE FROM VISION DATA, $\rho_{gps}$ IS THE CURVATURE FROM THE LOCATION DATA, $\alpha_{vision,\rho}$ IS THE VISION DATA WEIGHT FOR CURVATURE, $\alpha_{gps,\rho}$ IS THE LOCATION DATA WEIGHT FOR CURVATURE.

Fig. 6

| Straight Rows ($P_{gps}$ is small) | Vision Quality ($Q_{vision}$) | | | |
|---|---|---|---|---|
| | | GOOD | FAIR | POOR |
| GPS Quality ($Q_{gps}$) | GOOD | $\alpha_{off}$ = large<br>$\alpha_{head}$ = medium<br>$\alpha_{curv}$ = 0 | $\alpha_{off}$ = medium<br>$\alpha_{head}$ = medium<br>$\alpha_{curv}$ = 0 | $\alpha_{off}$ = small<br>$\alpha_{head}$ = small<br>$\alpha_{curv}$ = 0 |
| | FAIR | $\alpha_{off}$ = large<br>$\alpha_{head}$ = large<br>$\alpha_{curv}$ = 0 | $\alpha_{off}$ = large<br>$\alpha_{head}$ = medium<br>$\alpha_{curv}$ = 0 | $\alpha_{off}$ = medium<br>$\alpha_{head}$ = small<br>$\alpha_{curv}$ = 0 |
| | POOR | $\alpha_{off}$ = 1<br>$\alpha_{head}$ = large<br>$\alpha_{curv}$ = large | $\alpha_{off}$ = large<br>$\alpha_{head}$ = medium<br>$\alpha_{curv}$ = large | $\alpha_{off}$ = medium<br>$\alpha_{head}$ = medium<br>$\alpha_{curv}$ = large |

Fig. 8A

| Curved Rows ($P_{gps}$ is large) | Vision Quality ($Q_{vision}$) | | | |
|---|---|---|---|---|
| | | GOOD | FAIR | POOR |
| GPS Quality ($Q_{gps}$) | GOOD | $\alpha_{off}$ = medium<br>$\alpha_{head}$ = medium<br>$\alpha_{curv}$ = 0 | $\alpha_{off}$ = small<br>$\alpha_{head}$ = small<br>$\alpha_{curv}$ = 0 | $\alpha_{off}$ = 0<br>$\alpha_{head}$ = 0<br>$\alpha_{curv}$ = 0 |
| | FAIR | $\alpha_{off}$ = large<br>$\alpha_{head}$ = medium<br>$\alpha_{curv}$ = 0 | $\alpha_{off}$ = medium<br>$\alpha_{head}$ = small<br>$\alpha_{curv}$ = 0 | $\alpha_{off}$ = small<br>$\alpha_{head}$ = small<br>$\alpha_{curv}$ = 0 |
| | POOR | $\alpha_{off}$ = large<br>$\alpha_{head}$ = medium<br>$\alpha_{curv}$ = 0 | $\alpha_{off}$ = medium<br>$\alpha_{head}$ = medium<br>$\alpha_{curv}$ = 0 | $\alpha_{off}$ = medium<br>$\alpha_{head}$ = medium<br>$\alpha_{curv}$ = 0 |

Fig. 8B

DGPS Static Positioning Error

DGPS by "Tuning" Positioning Error

US 7,610,123 B2

VISION-AIDED SYSTEM AND METHOD FOR GUIDING A VEHICLE

This document claims priority based on U.S. provisional application Ser. No. 60/641,240, filed Jan. 4, 2005, and entitled VISION-AIDED SYSTEM AND METHOD FOR GUIDING A VEHICLE, under 35 U.S.C. 119(e).

FIELD OF THE INVENTION

This invention relates to a vision-aided system and method for guiding a vehicle.

BACKGROUND OF THE INVENTION

Global Positioning System (GPS) receivers have been used for providing position data for vehicular guidance applications. However, although certain GPS receivers with differential correction may have a general positioning error of approximately 10 centimeters (4 inches) during a majority of their operational time, an absolute positioning error of more than 50 centimeter (20 inches) is typical for five percent of their operational time. Further, GPS signals may be blocked by buildings, trees or other obstructions, which can make GPS-only navigation system unreliable in certain locations or environments. Accordingly, there is a need for supplementing or enhancing a GPS-based navigation system with one or more additional sensors to increase accuracy and robustness.

SUMMARY OF THE INVENTION

A method and system for guiding a vehicle comprises a location module (e.g., location-determining receiver) for collecting location data for the vehicle. A vision module collects vision data for the vehicle. A location quality estimator estimates location quality data for the corresponding collected location data during an evaluation time window. A vision module estimates vision quality data for the corresponding collected vision data during the evaluation time window. A supervisor module selects a location data weight, a vision data weight, or a mixing ratio based on the quality data for the evaluation time window or an application interval trailing the evaluation time window.

BRIEF DESCRIPTION OF THE DRAWINGS

FIG. 6 is a flow chart for a method for generating a control signal (e.g., an error signal) and a curvature in accordance with the invention.

FIG. 8A and FIG. 8B is a chart of vision data quality and location data quality as inputs and mixing ratios as outputs to determine a location data contribution (e.g., location data weights) and a vision data contribution (e.g., vision data weights) for vehicular guidance.

DESCRIPTION OF THE PREFERRED EMBODIMENT

Figure 1:
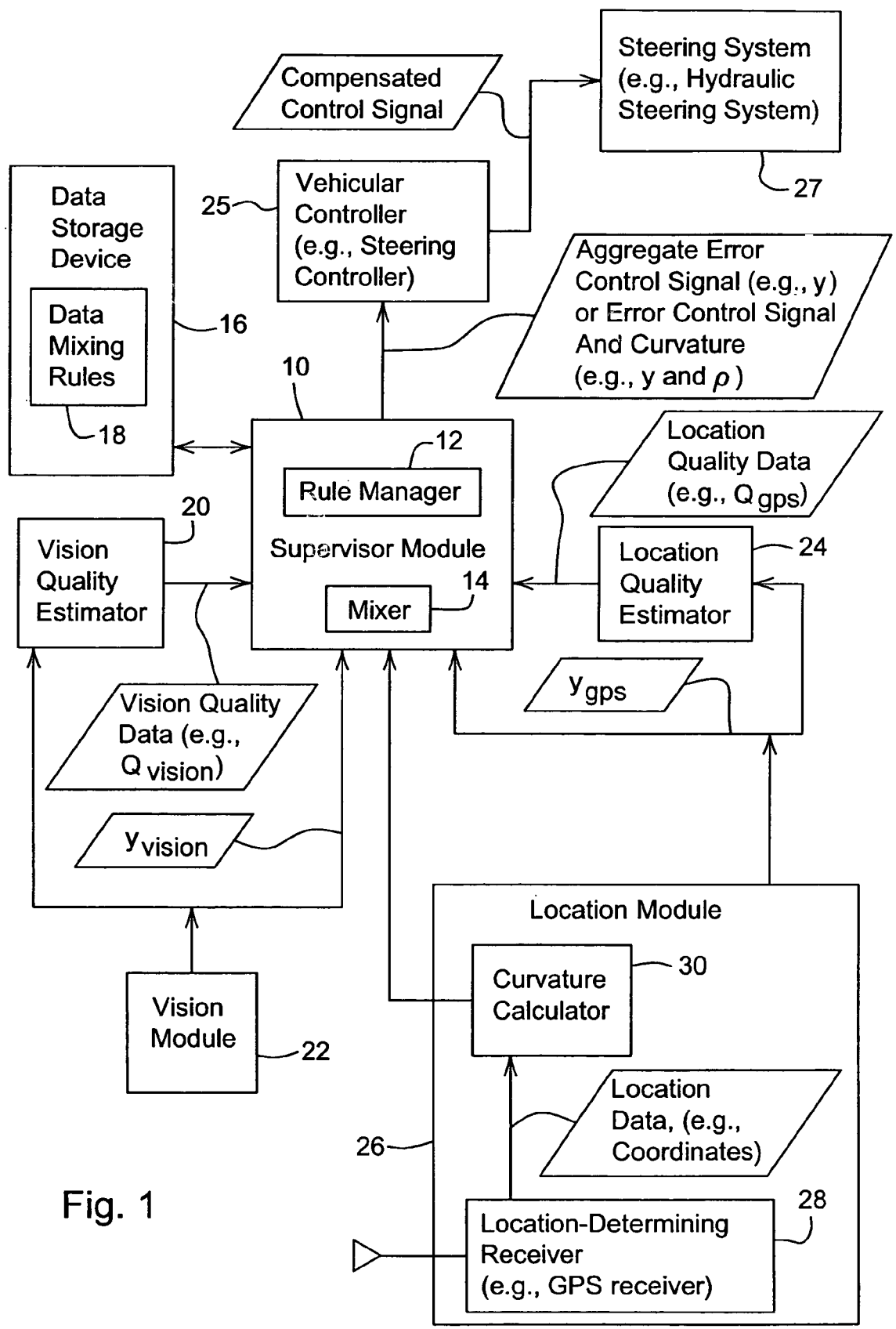
FIG. 1 is a block diagram of a system for guiding a vehicle based on location data and vision data in accordance with the invention.

FIG. 1 is a block diagram of a guidance system 11 for guiding a vehicle. The guidance system 11 may be mounted on or collocated with a vehicle or mobile robot. The guidance system 11 comprises a vision module 22 and a location module 26 that communicates with a supervisor module 10.

The vision module 22 may be associated with a vision quality estimator 20. The location module 26 may be associated with a location quality estimator 24. The supervisor module 10 may communicate with a data storage device 16, a vehicular controller 25, or both. In turn, the vehicular controller 25 is coupled to a steering system 27.

The location module 26 comprises a location-determining receiver 28 and a curvature calculator 30. The location-determining receiver 28 may comprise a Global Positioning System (GPS) receiver with differential correction. The location determining receiver provides location data (e.g., coordinates) of a vehicle. The curvature calculator 30 estimates the curvature or "sharpness" of a curved vehicle path or planned vehicle path. The curvature is the rate of change of the tangent angle to the vehicle path between any two reference points (e.g., adjacent points) along the path. The location module 26 may indicate one or more of the following conditions or status (e.g., via a status signal) to at least the supervisor module 10 or the location quality estimator 24: (1) where the location module 26 is disabled, (2) where location data is not available or corrupt for one or more corresponding evaluation intervals, and (3) where the estimated accuracy or reliability of the location data falls below a minimum threshold for one or more evaluation intervals. The location module 26 or location-determining receiver 28 provides location data for a vehicle that is well-suited for global navigation or global path planning.

In one illustrative embodiment, the location module 26 outputs location data in the following format:

$$y_{gps} = \begin{bmatrix} E_{\text{off\_gps}} \\ E_{\text{head\_gps}} \\ \rho_{gps} \end{bmatrix},$$

where $E_{\text{off\_gps}}$ is the off-track error estimated by the location module 26 (e.g., location-determining receiver 28), $E_{\text{head\_gps}}$ is the heading error estimated by the location module 26, and $\rho_{gps}$ is the radius of curvature estimated by the location module 26. The curvature does not represent an error estimate and there is no curvature quality associated with the radius of curvature as used herein; rather, the curvature is a parameter that may be used for selection of an appropriate guidance mode or guidance rules, for example.

The vision module 22 may comprise an image collection system and an image processing system. The image collection system may comprise one or more of the following: (1) one or more monocular imaging systems for collecting a group of images (e.g., multiple images of the same scene with different focus settings or lens adjustments, or multiple images for different field of views (FOV)); (2) a stereo vision system (e.g., two digital imaging units separated by a known distance and orientation) for determining depth information or three-dimensional coordinates associated with points on an object in a scene; (3) a range finder (e.g., laser range finder) for determining range measurements or three-dimensional coordinates of points on an object in a scene; (4) a ladar system or laser radar system for detecting the speed, altitude direction or range of an object in a scene; (5) a scanning laser system (e.g., a laser measurement system that transmits a pulse of light and estimates distance between the laser measurement system and the object based on the time of propagation between transmission of the pulse and reception of its reflection) for determining a distance to an object in a scene; and (6) an imaging system for collecting images via an optical micro-electromechanical system (MEMS), free-space optical MEMS, or an integrated optical MEMS. Free-space optical MEMS use compound semiconductors and materials with a range or refractive indexes to manipulate visible light, infrared, or ultraviolet light, whereas integrated optical MEMS use polysilicon components to reflect, diffract, modulate or manipulate visible light, infra-red, or ultraviolet light. MEMS may be structured as switching matrixes, lens, mirrors and diffraction gratings that can be fabricated in accordance with various semiconductor fabrication techniques. The images collected by the image processing system may be in color, monochrome, black-and-white, or grey-scale images, for example.

The vision module 22 may support the collection of position data (in two or three dimensional coordinates) corresponding to the location of features of an object within the image. The vision module 22 is well suited for using (a) features or local features of an environment around a vehicle, (b) position data or coordinates associated with such features, or both to facilitate navigation of the vehicle. The local features may comprise one or more of the following: plant row location, fence location, building location, field-edge location, boundary location, boulder location, rock locations (e.g., greater than a minimum threshold size or volume), soil ridge and furrows, tree location, crop edge location, cutting edge on other vegetation (e.g., turf), and a reference marker. The position data of local features may be used to tune (e.g., correct for drift) the location from the location module 26 on a regular basis (e.g., periodically). In one example, the reference marker may be associated with high precision location coordinates. Further, other local features may be related to the reference marker position. The current vehicle position may be related to the reference marker location or the fixed location of local features. In one embodiment, the vision module 22 may express the vehicle location in coordinates or a data format that is similar to or substantially equivalent to the coordinates or data format of the location module 26. The vision module 22 may indicate one or more of the following via a status or data message to at least the supervisor or the vision quality estimator 20: (1) where the vision module 22 is disabled, (2) where vision data is not available during one or more evaluation intervals, (3) where the vision data is unstable or corrupt, and (4) where the image data is subject to an accuracy level, a performance level or a reliability level that does not meet a threshold performance/reliability level.

In one example, a vision module 22 is able to identify plant row location with an error as small as 1 centimeter for soybeans and 2.4 centimeter for corn.

In one illustrative example, the vision module 22 outputs vision data in the following format:

$$y_{vision} = \begin{bmatrix} E_{\text{off\_vision}} \\ E_{\text{head\_vision}} \\ 0 \end{bmatrix},$$

where $E_{\textit{off\_vision}}$ is the off track error estimated by the vision module 22 and $E_{\textit{head\_vision}}$ is the heading error estimated by the vision module 22.

In another illustrative example or alternate embodiment, the vision module 22 outputs vision data in the following format:

$$y_{vision} = \begin{bmatrix} E_{\text{off\_vision}} \\ E_{\text{head\_vision}} \\ \rho_{vision} \end{bmatrix},$$

where $E_{\textit{off\_vision}}$ is the off track error estimated by the vision module 22, $E_{\textit{head\_vision}}$ is the heading error estimated by the vision module 22, and $\rho_{vision}$ is the radius of curvature estimated by the vision module 22.

The location quality estimator 24 may comprise one or more of the following devices: a signal strength indicator associated with the location-determining receiver 28, a bit error rate indicator associated with the location-determining receiver 28, another device for measuring signal quality, an error rate, signal strength, or performance of signals, channels, or codes transmitted for location-determination. Further, for satellite-based location-determination, the location quality estimator 24 may comprise a device for determining whether a minimum number of satellite signals (e.g., signals from four or more satellites on the L1 band for GPS) of a sufficient signal quality are received by the location-determining receiver 28 to provide reliable location data for a vehicle during an evaluation interval.

The location quality estimator 24 estimates the quality of the location data or location quality data (e.g., $Q_{gps}$) outputted by the location module 26. The location quality estimator 24 may estimate the quality of the location data based on the signal strength indicator (or bit-error rate) of each signal component received by the location-determining receiver 28. The location quality estimator 24 may also base the quality estimate on any of the following factors: (1) the number of satellite signals that are available in an area, (2) the number of satellites that are acquired or received by the location-determining receiver with a sufficient signal quality (e.g., signal strength profile) and (3) whether each satellite signal has an acceptable signal level or an acceptable bit-error rate (BER) or frame-error rate (FER).

In one embodiment, different signal strength ranges are associated with different corresponding quality levels. For example, the lowest signal strength range is associated with the low quality, a medium signal strength range is associated with a fair quality, and highest signal strength range is associated with a highest quality. Conversely, the lowest bit-error rate range is associated with the highest quality, the medium bit error range is associated with the fair quality, and the highest bit error rate range is associated with the lowest quality level. In other words, location quality data (e.g., $Q_{gps}$) may be associated with linguistic input values (e.g., low, medium and high).

The vision quality estimator 20 estimates the quality of the vision data or vision quality data (e.g., $Q_{vision}$) outputted by the vision module 22. The vision quality estimator 20 may consider the illumination present during a series of time intervals in which the vision module 22 operates and acquires corresponding images. The vision quality estimator 20 may include a photo-detector, a photo-detector with a frequency selective lens, a group of photo-detectors with corresponding frequency selective lenses, a charge-coupled device (CCD), a photometer, cadmium-sulfide cell, or the like. Further, the vision quality estimator 30 comprises a clock or timer for time-stamping image collection times and corresponding illumination measurements (e.g., luminance values for images). Vision quality may depend upon various factors disclosed herein; among those factors is illumination. In one example, if the illumination is within a low intensity range, the vision quality is low for the time interval; if the illumination is within a medium intensity range, the vision quality is high for the time interval; and if the illumination is within a high intensity range, the vision quality is fair, low or high for the time interval depending upon defined sub-ranges within the high intensity range. In other words, vision quality data (e.g., $Q_{vision}$) may be associated with linguistic input values (e.g., low, fair and high). The foregoing intensity range versus quality may be applied on a light frequency by light frequency or light color basis, in one example. In another example, the intensity range versus quality may be applied for infra-red range frequencies and for ultraviolet range frequencies differently than for visible light.

The vision quality estimation may be related to a confidence measure in processing the images. If the desired features (e.g., plant rows) are apparent in one or more images, the vision quality estimator 20 may assign a high image quality or high confidence level for the corresponding images. Conversely, if the desired features are not apparent in one or more images (e.g., due to missing crop rows), the vision quality estimator 20 may assign a low image quality or a low confidence level. In one example, the confidence level is determined based on a sum of the absolute-differences (SAD) of the mean intensity of each column vector (e.g., velocity vector for the vision module 22) for the hypothesized yaw/pitch pair. Yaw may be defined as the orientation of the vision module 22 in an x-y plane and pitch may be defined as the orientation of the vision module 22 in the an x-z plane, which is generally perpendicular to the x-y plane.

If the vision module 22 is unable to locate or reference a reference feature or reference marker in an image or has not referenced a reference marker in an image for a threshold maximum time, the vision module 22 may alert the vision quality estimator 20, which may degrade the quality of the vision data by a quality degradation indicator.

In general, the supervisor module 10 comprises a data processor, a microcontroller, a microprocessor, a digital signal processor, an embedded processor or any other programmable (e.g., field programmable) device programmed with software instructions. In one embodiment, the supervisor module 10 comprises a rule manager 12 and a mixer 14. The rule manager 12 may apply one or more data mixing rules 18, data decision functions, relationships, or if-then statements to facilitate the assignment of a vision weight to vision results derived from the vision data and a location weight to the location results derived from the location data for a corresponding time interval. The vision weight determines the extent that the contribution of the vision data (e.g., $y_{vision}$) from the vision module 22 governs. The location weight determines the extent that the contribution of location data from the location module 22 governs. The mixer 14 determines the relative contributions of location data (e.g., $y_{gps}$) and vision data (e.g., $y_{vision}$) to the aggregate error control signal (e.g., y) based on both the vision weight and the location weight. In one embodiment, the mixer 14 may comprise a digital filter, a digital signal processor, or another data processor arranged to apply one or more of the following: (1) the vision data weight, (2) the location data weight, and (3) a mixing ratio expression of the relative contributions of the location data and the vision data for an evaluation time interval.

The rule manager 12 may apply a fuzzy logic algorithm or another algorithm (e.g., a Kalman filtering approach) to obtain levels of the vision data weight and the location data weight. Although the data mixing rules 18 may be stored in a data storage device 16, the data mixing rules 18 may be stored in or resident in the supervisor module 10. In one example, the vision data weight and location data weight are expressed as a mixing ratio. The mixing ratio may be defined as a scalar or a multi-dimensional matrix. For example, the mixing ratio may be defined as the following matrix:

$$a = \begin{bmatrix} \alpha_{off} \\ \alpha_{head} \\ \alpha_{curv} \end{bmatrix},$$

where $\alpha$ is the aggregate mixing ratio matrix, $\alpha_{off}$ is the mixing ratio for off-track error data, $a_{head}$ is the mixing ratio for heading error data, and $\alpha_{curv}$ is the mixing ratio for curvature data.

The mixer 14 applies the vision weight and the location weight provided by the rule manager 12 or the mixing ratio (e.g., aggregate mixing ratio ($\alpha$)) to the mixing function. The output of the mixing function or mixer 14 is an aggregate error control signal (e.g., y):

$$y = \begin{bmatrix} E_{off} \\ E_{head} \\ \rho \end{bmatrix},$$

$E_{off}$ is the aggregate off-track error from the aggregation of error data from the vision module 22 and the location module 26, $E_{head}$ is the aggregate heading error from the aggregation of the error data from the vision module 22 and the location module 26 and $\rho$ is the radius of curvature. The aggregate error control signal represents a difference (or an error) between measured location data (measured by the vision module 22 and by location module) and the actual location of the vehicle. Such an aggregate error control signal is inputted to the vehicle controller 25 to derive a compensated control signal. The compensated control signal corrects the management and control of the steering system 27 based on the aggregate error control signal. The steering system 27 may comprise an electrical interface for communications with the vehicle controller 25. In one embodiment, the electrical interface comprises a solenoid-controlled hydraulic steering system or another electromechanical device for controlling hydraulic fluid.

In another embodiment, the steering system 27 comprises a steering system unit (SSU). The SSU may be associated with a heading versus time requirement to steer or direct the vehicle along a desired course or in conformance with a desired path plan. The heading is associated with a heading error (e.g., expressed as the difference between the actual heading angle an the desired heading angle).

The SSU may be controlled to compensate for errors in the estimated position of the vehicle by the vision module 22 or the location module 26. For example, an off-track error indicates or is representative of the actual position of the vehicle (e.g., in GPS coordinates) versus the desired position of the vehicle (e.g., in GPS coordinates). The off-track error may be used to modify the movement of the vehicle with a compensated heading. However, if there is no off-track error at any point in time or a time interval, an uncompensated heading may suffice. The heading error is a difference between actual vehicle heading and estimated vehicle heading by the vision module 22 and the location module 26. The curvature is the change of the heading on the desired path. The curvature data may be used by the SSU to control the vehicle to follow a desired curved path.

Figure 2:
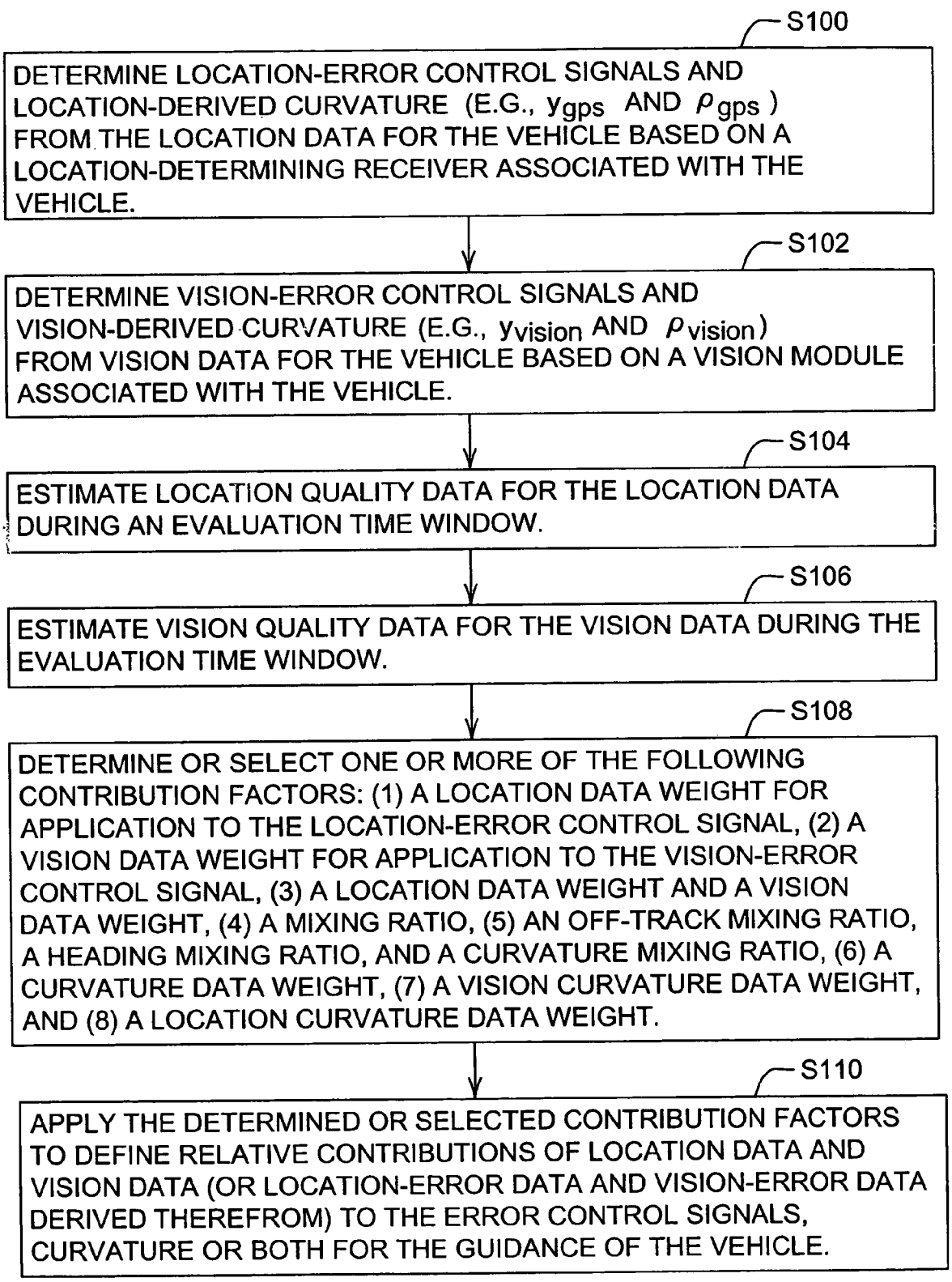
FIG. 2 is a flow chart of a method for guiding a vehicle based on location data and vision data in accordance with the invention.

FIG. 2 is a flow chart of a method for guiding a vehicle with a vision data and location data. The method of FIG. 2 begins in step S100.

In step S100, a location module 26 or a location-determining receiver 28 determines location data for a vehicle associated therewith. For example, the location-determining receiver 28 (e.g., a GPS receiver with differential correction) may be used to determine coordinates of the vehicle for one or more evaluation time intervals or corresponding times. Further, in step S100, the location module 26 may determine or derive a location-error signal (e.g., $y_{gps}$) a location-derived curvature (e.g., $\rho_{gps}$), or both from the location data. The location-error signal may represent a (1) difference between the actual vehicular location and a desired vehicular location for a desired time, (2) a difference between the actual vehicular heading and a desired vehicular heading for a desired time or position, (3) or another expression of error associated with the location data. The location-error signal may be defined, but need not be defined, as vector data. The location-derived curvature may represent a difference between the actual curvature and a desired curvature for a given time or another expression of error associated with the curvature.

In step S102, a vision module 22 associated with the vehicle determines vision data for one or more of said evaluation time intervals or corresponding times. For example, the vision module 22 may collect images and process the collected images to determine vision data. In one example, the vision data comprises vision-derived position data of a vehicle, which is obtained by reference to one or more visual reference marker or features with corresponding known locations to determine coordinates of a vehicle. The coordinates of a vehicle may be determined in accordance with a global coordinate system or a local coordinate system. Further, in step S102, the location module 26 may determine or derive a vision error signal (e.g., $y_{vision}$), a vision-derived curvature (e.g., $\rho_{vision}$), or both from the location data. The vision error signal represents (1) a difference between the actual vehicular location and a desired vehicular location for a desired time, (2) a difference between the actual vehicular heading and a desired vehicular heading for a desired time or position, (3) or another expression of error associated with the vision data. The vision-derived curvature may represent a difference between an actual curvature and a desired curvature for a given time or the expression of error associated with the curvature.

In step S104, a location quality estimator 24 estimates location quality data for the location data during an evaluation time window. Step S104 may be carried out by various techniques which may be applied alternately or cumulatively. Under a first technique, the location quality estimator 24 may estimate or measure signal quality, an error rate (e.g., bit error rate or frame error rate), a signal strength level (e.g., in dBm), or other quality levels. Under a second technique, the location quality estimator 24 first estimates or measures signal quality, an error rate (e.g., bit error rate or frame error rate), a signal strength level (e.g., in dBm), or other quality levels; second, the location quality estimator 24 classifies the signal quality data into ranges, linguistic descriptions, linguistic values, or otherwise. The second technique is useful where subsequent processing (or a subsequent method step) involves a fuzzy logic approach.

In step S106, a vision quality estimator 20 estimates vision quality data during the evaluation time window. The vision quality estimator 20 may comprise a luminance or photo-detector and a time or clock for time-stamping luminance measurements to determine a quality level based on the ambient lighting conditions. The vision quality estimator 20 may also comprise a measure of confidence or reliability in processing the images to obtain desired features. The confidence or reliability in processing the images may depend upon any of the following factors, among others: technical specification (e.g., resolution) of the vision module 22, reliability of recognizing an object (e.g., landmark in an image), reliability of estimating a location of the recognized object or a point thereon, reliability of converting image coordinates or local coordinates to a global coordinates or vision-derived location data that is spatially and temporally consistent with the location data from the location module 26.

Step S106 may be carried out by various techniques which may be applied alternately or cumulatively. Under a first technique, the vision quality estimator 20 may estimate a confidence or reliability in the accuracy of vision-derived location data. Under a second technique, the vision quality estimator 20 first estimates the confidence level, reliability level or another quality level in the accuracy of the vision-derived location data; and, second, the vision quality estimator 20 converts the quality level into a corresponding linguistic value. The second technique is useful for application to a fuzzy logic approach in subsequent processing.

In step S108, a supervisor module 10 determines or selects one or more of the following contribution factors: (1) a location data weight for application to a location-error signal, (2) a vision data weight for application to the vision-error signal, (3) a location data weight and a vision data weight, (4) a mixing ratio, (5) an off-track mixing ratio, a heading mixing ratio, and a curvature mixing ratio, (6) a curvature data weight, (7) a vision curvature data weight and, (8) a location curvature data weight. The location-error signal may represent a derivative of the location data, whereas the vision data weight may represent a derivative of the vision data. The mixing ratio defines relative contributions of the vision data and location data to error control signals, curvature, or both. It is understood that the mixing ratio may be related to the vision data weight and the location data weight by one or more equations.

Step S108 may be carried out in accordance with various techniques, which may be applied alternately and cumulatively. Under a first technique for executing step S108, the supervisor module 10 applies one or more data mixing rules 18 to obtain a location data weight and a vision data weight.

Under a second technique for executing step S108, the supervisor module 10 applies one or more data mixing rules 18 to obtain a defined mixing ratio.

Under a third technique for executing step S108, the supervisor accesses a data storage device 16 (e.g., a look-up table, a database, a relational database, a tabular file) with input set data as location quality data and vision quality data and corresponding output set data as location data weight and vision data weights. Each input set data is associated with a corresponding unique output set data, for example.

Under a fourth technique for executing step S108, the supervisor accesses a data storage device 16 (e.g., a look-up table, a database, a relational database, a tabular file) with input set data as location quality data and vision quality data and corresponding output set data as mixing ratios.

Under a fifth technique for executing step S108, the supervisor access a data storage device 16 with input data set as location quality data and vision quality data and corresponding output set data as location data weight and vision data weights. Further, each input set data is associated with a corresponding linguistic input values and each output set data is associated with a corresponding linguistic output values. The linguistic input and output values may also be known as fuzzy descriptors.

In step S110, the supervisor module 10 or the mixer 14 applies any contribution factors determined in step S108 to define relative contributions of location data and vision data (or location-error data and vision-error data derived therefrom) to the error control signals, curvature or both for the guidance of the vehicle. For example, the supervisor module 10 or the mixer 14 applies a location data weight, a vision data weight, and a mixing ratio to the error control signals. The location data weight is based on the estimated location data quality for corresponding location data. The vision data weight is based on the estimated vision data quality for corresponding vision data.

In one illustrative example, the location data weight and the vision data weight are derived based on an evaluation time window; the location data weight and the vision data weight may be applied during an application time window that lags the evaluation time window or that is substantially coextensive with the evaluation time interval. Regardless of how the evaluation time window and the application time window are defined in this example, in other examples the supervisor module 10 may provide predictive control data, feed-forward control data, or feedback control data to the vehicle controller 25.

Figure 3:
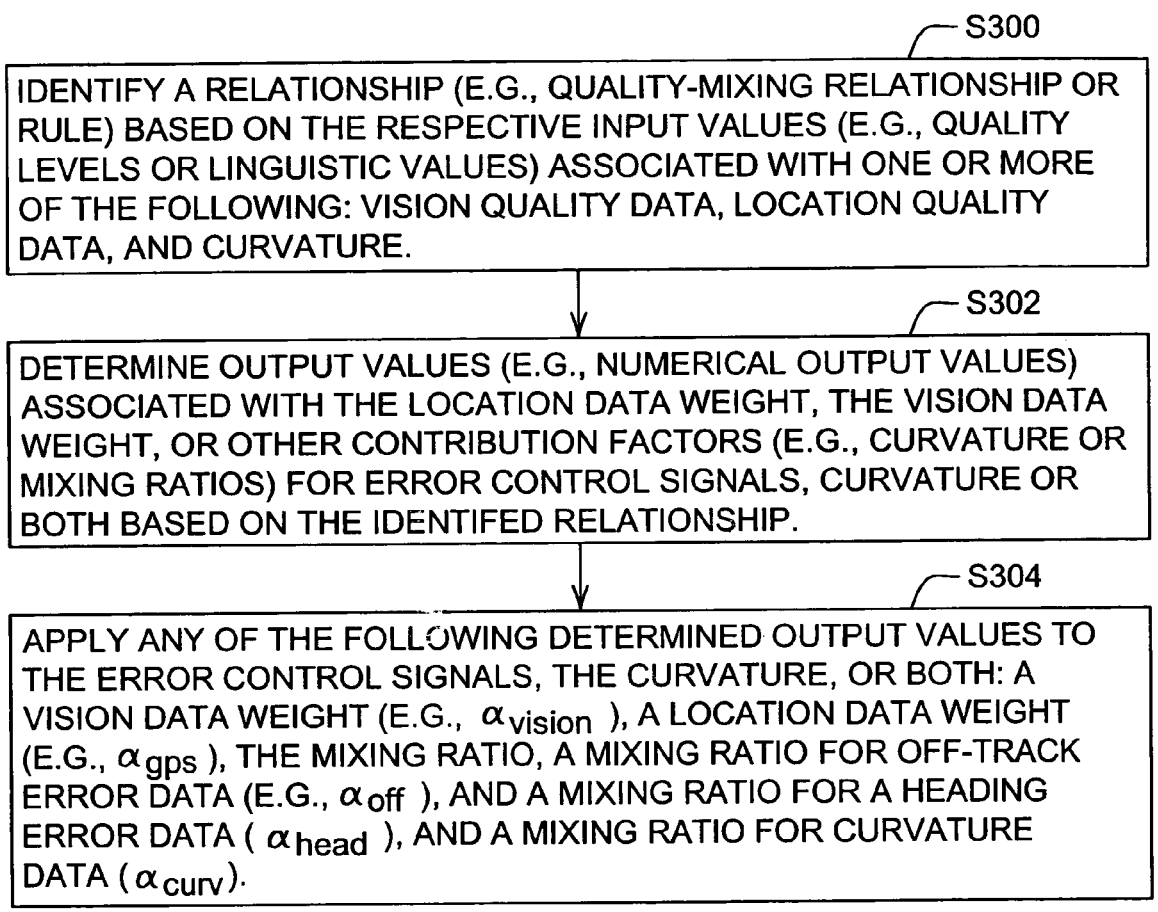
FIG. 3 is a flow chart of a method for determining the relative contributions (e.g., weights) of location data and vision data for vehicular guidance in accordance with the invention.

FIG. 3 is a flow chart of a method for determining the relative contributions of location data and vision data for vehicular guidance of a vehicle. The method of FIG. 3 may be applied to step S108 of FIG. 2 for the selection of an appropriate location data weight and a vision data weight and to step S110 for the application of weights to guide a vehicle. The method of FIG. 3 begins in step S300.

In step S300, a supervisor module 10 or a rule manager 12 identifies a relationship (e.g., quality-mixing ratio relationship or rule) based on the respective input values (e.g., quality levels or linguistic values) associated with one or more of the following: vision quality data, location quality data, and curvature.

Step S300 may be carried out in accordance with various techniques, that may be applied alternatively and cumulatively. Under a first technique, the supervisor module 10 identifies a relationship based on a first quality level of the location quality data and a second quality level of the vision quality data as the input values. A quality level (e.g., the first quality level or the second quality level) may be a numerical quantity or a measurement value provided by the location quality estimator 24, the vision quality module 20, or both. For example, for the location quality, the measurement may comprise a signal strength, a bit-error rate (BER) or frame-error rate (FER) of a Global Positioning System (GPS) signal, or a component thereof. Each combination of the first quality level and the second quality level may be associated with a corresponding relationship or rule that uniquely applies to that combination.

Under a second technique, the supervisor module 10 identifies a relationship based on a first quality level of the location quality data and a second quality level of the vision quality data as the input values. The combination of the first quality level and the second quality level may be associated with a corresponding relationship that uniquely applies to the combination. A database or data storage device may contain an input set of first quality levels and second quality levels that is associated with an output set of location data weights and vision data weights. Alternatively, the database or data storage device may contain an input set of first quality levels and second quality levels that are associated with mixing ratios for the error signals, the curvature, or both.

Under a third technique, the supervisor module 10 identifies a relationship based on a first quality level of the location quality data, a second quality level of the vision quality data, and a curvature value as the input values. The combination of the first quality level, the second quality level, and the curvature value may be associated with a corresponding relationship that uniquely applies to the combination. A database or data storage device 16 may contain an input set of first quality levels, second quality levels, and curvature values that is associated with an output set of location data weights and vision data weights. Alternatively, the database or data storage device 16 may contain an input set of first quality levels, second quality levels, and curvature values that are associated with mixing ratios for the error signals, the curvature, or both.

Under a fourth technique, the supervisor module 10 applies a fuzzy logic approach. For the fuzzy logic approach a two stage process is adopted. In the first stage, the first quality level of the location quality data (e.g., $Q_{gps}$), the second quality level of the vision quality data (e.g., $Q_{vision}$), and the curvature value (e.g., $\rho$) may be converted from numerical values (e.g., raw measurements) into linguistic values. Linguistic values or linguistic input values represent classification of the quality or general quality level of vision quality data and location quality data. For example, a linguistic input value may be defined as "good," "fair," "poor," "high," "average," or "low" for the vision quality data (e.g., $Q_{vision}$) and location quality data (e.g., $Q_{gps}$). The linguistic values for the radius of curvature (e.g., $\rho$ or $\rho_{vision}$ or $\rho_{gps}$) may be "small", "low", "large" or "high." In the second stage of the fuzzy logic approach, an input set of linguistic values for vision quality data, location quality data and curvature is compared to a reference list or data mixing rules 18 to identify a corresponding relationship (e.g., quality-mixing ratio relationship or rule) associated with the input set.

In an alternative embodiment, the linguistic value may be defined in terms of numerical ranks (e.g., a rank of 1 to 5, with 5 being the highest), percentile ranks, performance ratings (e.g., one-star to N stars, where N is any whole number greater than one) or otherwise for the vision quality data and the location quality data.

In step S302, a supervisor module 10 determines output values (e.g., numerical output values) associated with the location data weight, the vision data weight, or other contribution factors (e.g., curvature or mixing ratios) for the error control signals, curvature or both based on the identified relationship of step S300. If the first technique through the third technique of step S300 was applied, the output value of step S302 may comprise a numerical output value including one or more of the following: a vision data weight (e.g., $\alpha_{vision}$) a location data weight (e.g., $\alpha_{gps}$), a mixing ratio for off-track error data (e.g., $\alpha_{off}$), a mixing ratio for a heading error data ($\alpha_{head}$), and a mixing ratio for curvature data ($\alpha_{curv}$). Where the fourth technique or a fuzzy logic approach is used in step S300, the supervisor module 10 may apply a defuzzification process or another conversion process in step S302 (or prior thereto) to convert the linguistic values to their numerical output values.

In step S304, the supervisor module 10 or mixer 14 applies any of the following determined output values to the error control signals, the curvature, or both: a vision data weight ($\alpha_{vision}$) a location data weight ($\alpha_{gps}$), the mixing ratio, a mixing ratio for off-track error data (e.g., $\alpha_{off}$), and a mixing ratio for a heading error data ($\alpha_{head}$), a mixing ratio for curvature data ($\alpha_{curv}$), and numerical values for any of the foregoing items. The supervisor module 10 or mixer 14 applies the vision data weight and the location data weight (e.g., or numerical values therefor) to determine the relative contributions of the vision data and the location data to the error control signals for a time interval (e.g., an application time interval).

Figure 4:
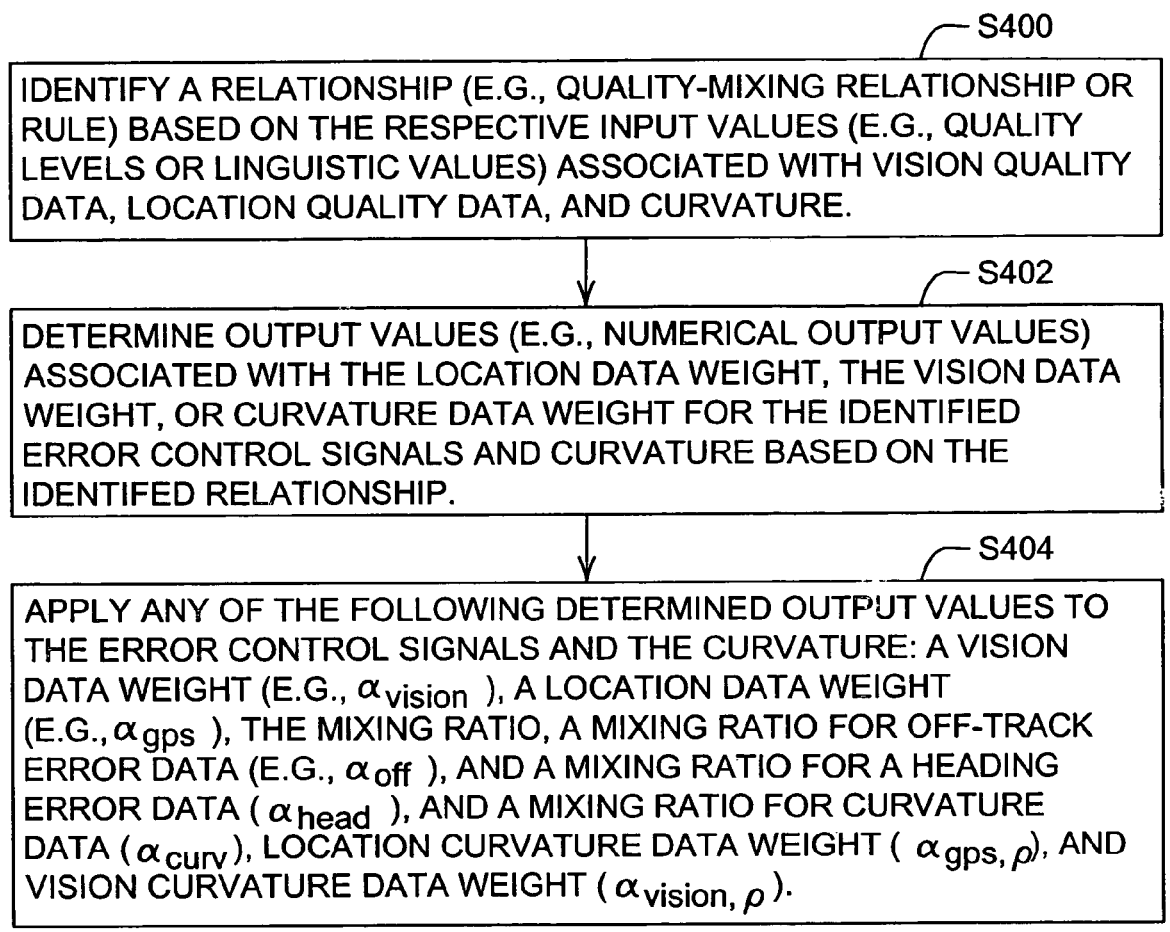
FIG. 4 is a flow chart for another method for determining the relative contributions (e.g., weights) of location data and vision data for vehicular guidance in accordance with the invention.

FIG. 4 is a flow chart of a method for determining the relative contributions of location data and vision data for vehicular guidance. The method of FIG. 4 may be applied to step S108 and step S110 of FIG. 2 for the selection and application of an appropriate location data weight and a vision data weight. The method of FIG. 4 begins in step S400.

In step S400, a supervisor module 10 or a rule manager 12 identifies a relationship (e.g., quality-mixing ratio relationship or rule) based on the respective input values (e.g., quality levels or linguistic values) associated with vision quality data, location quality data, and curvature.

Step S400 may be carried out in accordance with various techniques that may be applied alternatively and cumulatively. Under a first technique, the supervisor module 10 identifies a relationship based on a first quality level of the location quality data, a second quality level of the vision quality data, and a curvature value as the input values. A quality level (e.g., the first quality level or the second quality level) may be a numerical quantity or a measurement value provided by the location quality estimator 24, the vision quality module 20, or both. For example, for the location quality, the measurement may comprise a signal strength, a bit-error rate (BER) or frame-error rate (FER) of a Global Positioning System (GPS) signal, or a component thereof.

The combination of the first quality level, the second quality level, and the curvature value may be associated with a corresponding relationship that uniquely applies to the combination. A database or data storage device 16 may contain an input set of first quality levels, second quality levels, and curvature values that is associated with an output set of location data weights and vision data weights. Alternatively, the database or data storage device 16 may contain an input set of first quality levels, second quality levels, and curvature values that are associated with mixing ratios for the error signals, the curvature, or both.

Under a second technique, the supervisor module 10 applies a fuzzy logic approach. For the fuzzy logic approach a two stage process is adopted. In the first stage, the first quality level of the location quality data (e.g., $Q_{gps}$), the second quality level of the vision quality data (e.g., $Q_{vision}$), and the curvature value (e.g., $\rho$) may be converted from numerical values (e.g., raw measurements) into linguistic values. Linguistic values or linguistic input values represent classification of the quality or general quality level of vision quality data and location quality data. For example, a linguistic input value may be defined as "good," "fair," "poor," "high," "average," or "low" for the vision quality data (e.g., $Q_{vision}$) and location quality data (e.g., $Q_{gps}$). The linguistic values for weights (e.g., $\alpha_{gps,\rho}$ or $\alpha_{vision,\rho}$) or mixing ratios associated the radius of curvature (e.g., $\rho$ or $\rho_{vision}$ or $\rho_{gps}$) may be "small", "low", "large" or "high." In the second stage of the fuzzy logic approach, an input set of linguistic values for vision quality data, location quality data and curvature is compared to a reference list or data mixing rules 18 to identify a corresponding relationship (e.g., quality-mixing ratio relationship or rule) associated with the input set.

In an alternative embodiment, the linguistic value may be defined in terms of numerical ranks (e.g., a rank of 1 to 5, with 5 being the highest), percentile ranks, performance ratings (e.g., one-star to N stars, where N is any whole number greater than one) or otherwise for the vision quality data and the location quality data.

In step S402, a supervisor module 10 determines output values (e.g., numerical output values) associated with the location data weight, the vision data weight, or curvature data weight for the error control signals and curvature based on the identified relationship of step S400. If the first technique of step S400 was applied, the output value of step S402 may comprise a numerical output value including one or more of the following: a vision data weight (e.g., $\alpha_{vision}$) a location data weight (e.g., $\alpha_{gps}$), a mixing ratio for off-track error data (e.g., $\alpha_{off}$), a mixing ratio for a heading error data ($\alpha_{head}$), a mixing ratio for curvature data ($\alpha_{curv}$), location curvature data weight $\alpha_{gps,\rho}$, and vision curvature data weight $\alpha_{vision,\rho}$. Where the second technique or a fuzzy logic approach is used in step S400, the supervisor module 10 may apply a defuzzification process or another conversion process in step S402 (or prior thereto) to convert the linguistic values to their numerical output values.

In step S404, the supervisor module 10 or mixer 14 applies any of the following determined output values to the error control signals and the curvature: a vision data weight ($\alpha_{vision}$), a location data weight ($\alpha_{gps}$), the mixing ratio, a mixing ratio for off-track error data (e.g., $\alpha_{off}$), and a mixing ratio for a heading error data ($\alpha_{head}$), a mixing ratio for curvature data ($\alpha_{curv}$), location curvature data weight ($\alpha_{gps,\rho}$), and vision curvature data weight ($\alpha_{vision,\rho}$), and numerical values for any of the foregoing items. The supervisor module 10 or mixer 14 applies the vision data weight and the location data weight (e.g., or numerical values therefor) to determine the relative contributions of the vision data and the location data to the error control signals for a time interval (e.g., an application time interval).

Figure 5:
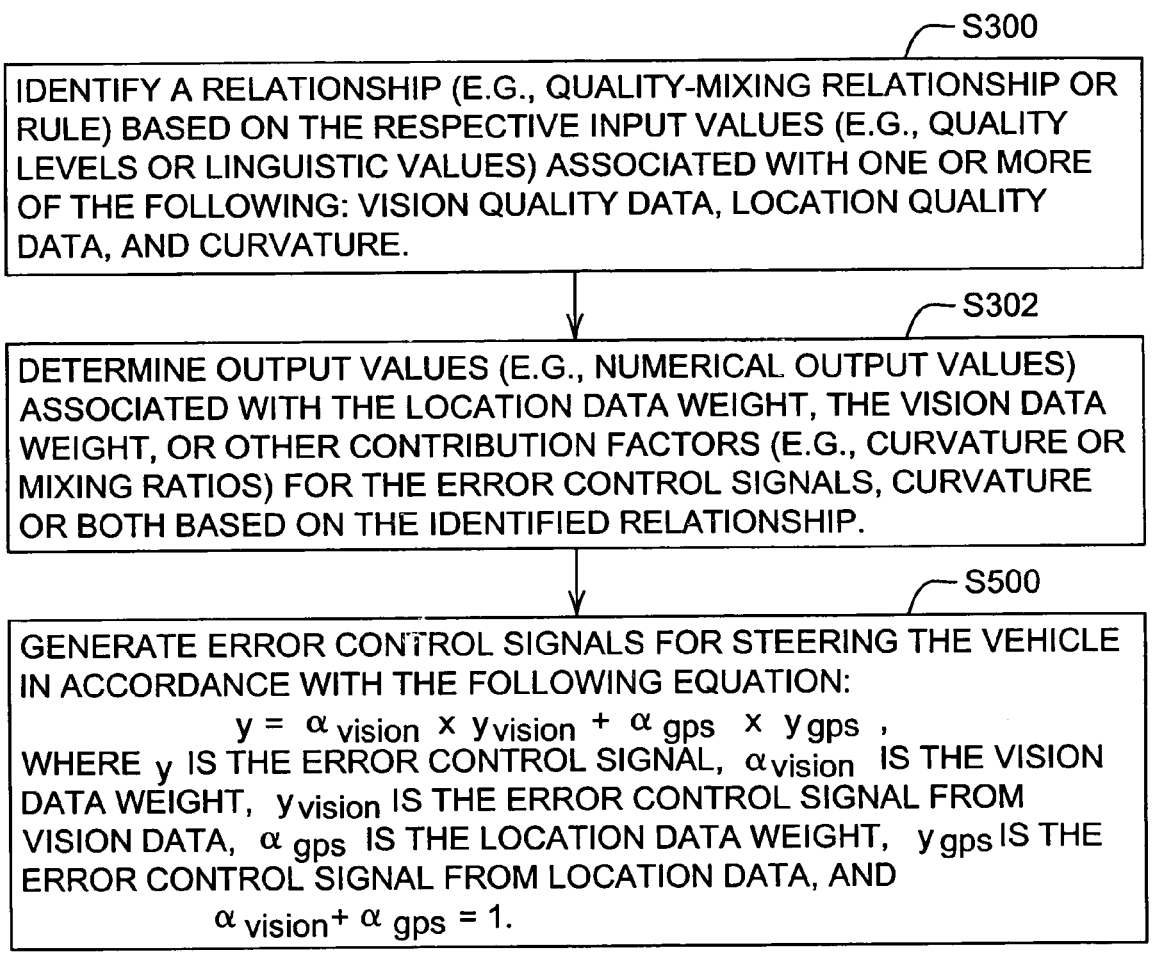
FIG. 5 is a flow chart for a method for generating a control signal (e.g., an error signal) based on the location data and vision data in accordance with the invention.

FIG. 5 is a flow chart of a method for determining a control signal (e.g., an aggregate error control signal) for a vehicle. The method of FIG. 5 may be applied to step S108 and S110 of FIG. 2 for the selection of an appropriate location data weight and a vision data weight. FIG. 5 is similar to FIG. 3, except FIG. 5 replaces step S304 with step S500. Like steps or procedures in FIG. 3 and FIG. 5 are indicated by like reference numbers.

In step S500, a supervisor module 10 or a guidance module for a vehicle generates an error control signal for steering the vehicle. For example, the supervisor module 10 for a vehicle generates an error control signal for steering a vehicle in accordance with the following equation: $y = \alpha_{vision} \times y_{vision} + \alpha_{gps} \times y_{gps}$, where y is the aggregate error control signal, $\alpha_{vision}$ is the vision data weight, $y_{vision}$ is the error control signal from the vision data, $\alpha_{gps}$ is the location data weight and $y_{gps}$ is the error control signal from location data (e.g., GPS data). The error control signal from the vision data may be referred to as the vision error signal. The error control signal from the location data may be referred to as the location error signal. It is understood that y, $\alpha_{vision}$, $y_{vision}$, $\alpha_{gps}$ and $y_{gps}$ may be expressed as matrices. For example, y (the aggregate error control signal), $\alpha_{vision}$, $\alpha_{gps}$, $y_{vision}$ (the vision error signal) and $y_{gps}$ (the location error signal) may be defined as follows:

$$y = \begin{bmatrix} E_{off} \\ E_{head} \end{bmatrix},$$

$E_{off}$ is the aggregate off-track error from the aggregation of off-track error data (e.g., $E_{off\_gps}$ and $E_{off\_vision}$) from the location module 26 and the vision module 22 and, $E_{head}$ is the aggregate heading error from the aggregation of the error data (e.g., $E_{head\_gps}$ and $E_{head\_vision}$) from the location module 26 and the vision module 22.

$$a_{vision} = \begin{bmatrix} \alpha_{off\_vision} \\ \alpha_{head\_vision} \end{bmatrix},$$

where $\alpha_{vision}$ is the vision data weight, $\alpha_{off\_vision}$ is the vision data weight for off track error data, and $\alpha_{head\_vision}$ is the vision data weight for heading error data.

$$y_{vision} = \begin{bmatrix} E_{off\_vision} \\ E_{head\_vision} \end{bmatrix},$$

where $E_{off\_vision}$ is the off track error estimated by the vision module 22 and $E_{head\_vision}$ is the heading error estimated by the vision module 22.

$$a_{gps} = \begin{bmatrix} \alpha_{off\_vision} \\ \alpha_{head\_vision} \end{bmatrix},$$

where $\alpha_{gps}$ is the location data weight, $\alpha_{off\_gps}$ is the location data weight for off track error data, and $\alpha_{head\_gps}$ is the location data weight for heading error data.

$$y_{gps} = \begin{bmatrix} E_{off\_gps} \\ E_{head\_gps} \end{bmatrix},$$

where $E_{off\_gps}$ is the off-track error estimated by the location module 26 (e.g., location-determining receiver 28), and $E_{head\_gps}$ is the heading error estimated by the location module 26.

FIG. 6 is a flow chart of a method for determining a control signal for a vehicle. The method of FIG. 6 may be applied to step S108 and S110 of FIG. 2 for the selection and application of an appropriate location data weight and a vision data weight FIG. 6 is similar to FIG. 4, except FIG. 6 replaces step S404 with step S502. Like steps in FIG. 3 and FIG. 5 are indicated by like reference numbers.

In step S502, a supervisor module 10 or a guidance module for a vehicle generates an error control signal and a curvature signal for steering the vehicle. For example, the supervisor module 10 for a vehicle generates an error control signal for steering a vehicle in accordance with the following equation:

$y = \alpha_{vision} \times y_{vision} + \alpha_{gps} \times y_{gps}$, where y is the aggregate error control signal, $\alpha_{vision}$ is the vision data weight, $y_{vision}$ is the error control signal from the vision data, $\alpha_{gps}$ is the location data weight and $y_{gps}$ is the error control signal from location data (e.g., GPS data).

Further, the supervisor module 10 generates a curvature signal for steering the vehicle in accordance with the following equation.

$\rho = \alpha_{vision,\rho} \times \rho_{vision} + \alpha_{gps,\rho} \times \rho_{gps}$, where $\rho$ is the curvature signal, $\alpha_{vision,\rho}$ is the vision data weight for the curvature or vision curvature data weight, $\rho_{vision}$ is the vision-derived curvature from the vision data, $\alpha_{gps,\rho}$ is the location data weight for curvature or location curvature data weight, and $\rho_{gps}$ is the error control signal from location data (e.g., GPS data). Further, $\alpha_{vision,\rho} + \alpha_{gps,\rho} = 1$.

The error control signal from the vision data may be referred to as the vision error signal. The error control signal from the location data may be referred to as the location error signal. It is understood that y, $\alpha_{vision}$, $y_{vision}$, $\alpha_{gps}$, $y_{gps}$, $\alpha_{vision,\rho}$, $\rho_{vision}$, $\alpha_{gps,\rho}$, and $\rho_{gps}$ may be expressed as matrices. For example, y (the aggregate error control signal), $\alpha_{vision}$ (vision data weight), $\alpha_{gps}$ (location data weight), $y_{vision}$ (the vision error signal) and $y_{gps}$ (the location error signal) may be defined as follows:

$$y = \begin{bmatrix} E_{off} \\ E_{head} \\ \rho \end{bmatrix},$$

$E_{off}$ is the aggregate off-track error from the aggregation of off-track error data (e.g., $E_{off\_g}$ and $E_{off\_v}$) from location module 26 and the vision module 22, $E_{head}$ is the aggregate heading error from the aggregation of the heading error data (e.g., $E_{head\_g}$ and $E_{head\_v}$) from the location module 26, the vision module 22 and $\rho$ is the aggregated radius of curvature.

$$a_{vision} = \begin{bmatrix} \alpha_{off\_vision} \\ \alpha_{head\_vision} \\ \alpha_{curv\_vision} \end{bmatrix},$$

where $\alpha_{vision}$ is the aggregate vision data weight matrix, $\alpha_{off\_vision}$ is the vision data weight for off-track error data, $\alpha_{head\_vision}$ is the vision data weight for heading error data, and $\alpha_{curv\_vision}$ is vision data weight for curvature error data. Typically, $\alpha_{curv\_vision} = 0$.

$$y_{vision} = \begin{bmatrix} E_{off\_vision} \\ E_{head\_vision} \\ \rho_{vision} \end{bmatrix},$$

where $E_{off\_vision}$ is the off track error estimated by the vision module 22 and $E_{head\_vision}$ is the heading error estimated by the vision module 22, and $\rho_{vision}$ is the radius of curvature associated with the vision module 22. If the vision module does not provide a radius of curvature, then $\rho_{vision}$ can be set equal to zero.

$$a_{gps} = \begin{bmatrix} \alpha_{off\_gps} \\ \alpha_{head\_gps} \\ \alpha_{curv\_gps} \end{bmatrix},$$

where $\alpha_{gps}$ is the aggregate location data weight matrix, $\alpha_{off\_gps}$ is the location data weight for off-track error data, $\alpha_{head\_gps}$ is the location data weight for heading error data, and $\alpha_{curv\_gps}$ is the location data weight for curvature error data. Typically, $\alpha_{curv\_gps}=0$.

$$y_{gps} = \begin{bmatrix} E_{off\_gps} \\ E_{head\_gps} \\ \rho_{gps} \end{bmatrix},$$

where $E_{off\_gps}$ is the off-track error estimated by the location module 26 (e.g., location-determining receiver 28), $E_{head\_gps}$ is the heading error estimated by the location module 26, and $\rho_{gps}$ is the radius of curvature associated with the location module 26.

Figure 7:
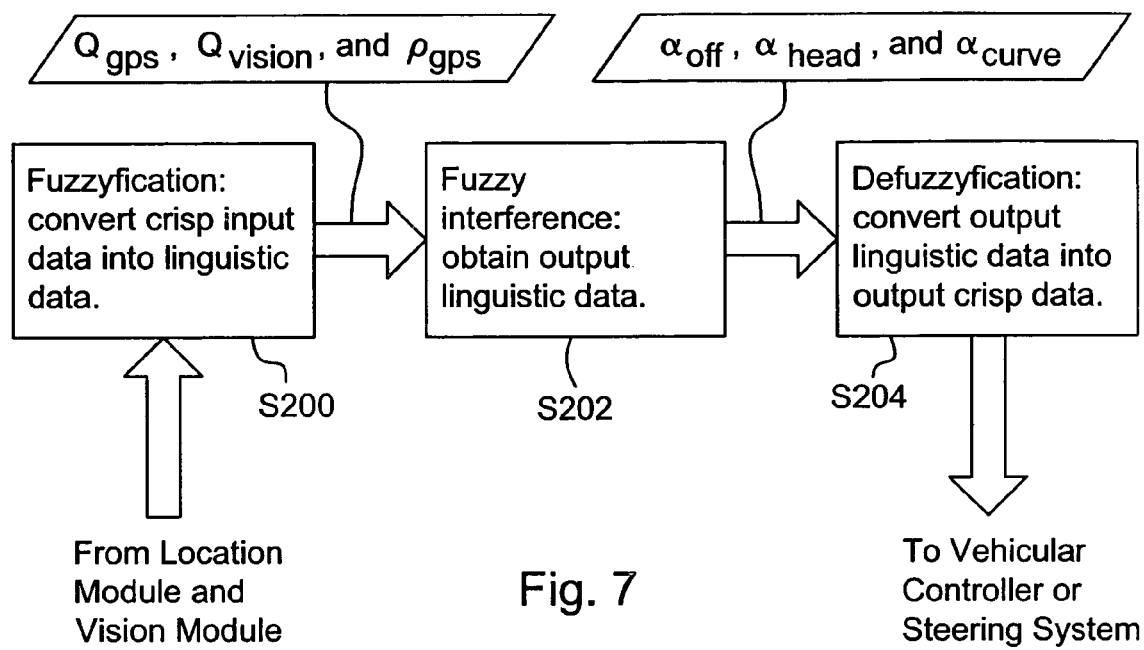
FIG. 7 is flow chart of the fuzzy logic aspect of the system and method of this invention.

FIG. 7 is a flow chart of the fuzzy logic aspect of the method and system of guiding a vehicle with vision-aided guidance. The flow chart of FIG. 7 begins in step S200.

In step S200, the vision quality estimator 20, the location quality estimator 24, or both convert crisp input data into input linguistic data. The crisp input data may be received from at least one of the following: vision module 22 and the location module 26. The vision quality estimator 20 and the location quality estimator 24 may each contain a converter or classifier for converting or classifying ranges of numerical data into linguistic data. The input linguistic data may comprise location quality data (e.g., $Q_{gps}$), vision quality data (e.g., $Q_{vision}$). In one example, location quality data ($Q_{gps}$) has the following states or linguistic input data: good, fair, and poor; vision quality ($Q_{vision}$) has the following states or linguistic input data: good, fair and poor; and curvature ($\rho_{gps}$) is small or large, although each of the foregoing quality indicators may have another input set of input linguistic data that defines one or more levels, ranges, or regions of performance or quality. Step S200 may be referred to as a fuzzification process.

In step S202, a data processor or supervisor module 10 makes an inference to obtain output linguistic data from the input linguistic data of step S200. For example, data mixing rules 18 in the data storage device 16 may contain input linguistic data associated with corresponding output linguistic data. The quality mixing-ratio relationship between the input linguistic values and the output linguistic values is based on a model that models the performance of the vision module 22 and the location-determining receiver 28. In one example, the output linguistic data may comprise the states associated with $\alpha_{off}$, $\alpha_{head}$, and $\alpha_{curv}$. The states of $\alpha_{off}$, $\alpha_{head}$, and $\alpha_{curv}$ may be "small," "medium," or "large," for example. In another example, the output linguistic data may comprise the states of any of the following: $\alpha_{gps}$, $\rho$, $\alpha_{vision}$, $\rho$, $\alpha_{off\_vision}$, $\alpha_{head\_vision}$, $\alpha_{curv\_vision}$, $\alpha_{off\_gps}$, $\alpha_{head\_gps}$, and $\alpha_{curv\_gps}$. The states of $\alpha_{gps}$, $\rho$, $\alpha_{vision}$, $\rho$, $\alpha_{off\_vision}$, $\alpha_{head\_vision}$, $\alpha_{curv\_vision}$, $\alpha_{off\_gps}$, $\alpha_{head\_gps}$, and $\alpha_{curv\_gps}$ may be "small," "medium," or "large," for example.

In step S204, a converter converts the output linguistic data to output crisp data. For example, the output crisp data may be sent to a vehicular controller 25, a steering system (e.g., a steering controller or steering system unit (SSU)). Step S204 may be referred to as the defuzzification process. The crisp data may be expressed as an aggregate error control signal (y), or a derivative thereof, such as a compensated control signal.

FIG. 8A is a chart which may be applied to step S202, which may be referred to as the fuzzy inference. Further, FIG. 8A may be applied to S300 and S302 of FIG. 5 or to S400 or S402 of FIG. 6. The chart of FIG. 8A contains a series of rules or relationships.

FIG. 8A pertains to a path plan where the path plan is generally linear or includes generally straight rows. For example, the relationships of FIG. 8A may hold where $\rho_{gps}$ is small, or within a range that indicates a planned path or actual path (or a segment thereof) is generally linear or straight. Vision quality ($Q_{vision}$) appears in the uppermost row, whereas location quality ($Q_{gps}$) (e.g., GPS quality) appears in the leftmost column. Vision quality ($Q_{vision}$) is associated with the input variables, input set or input linguistic data which appears in the row immediately underneath the uppermost row. As illustrated in FIG. 8A, the input linguistic data for vision quality comprises "good", "fair", and "poor", although other input variables or input linguistic data fall within the scope of the invention. Location quality ($Q_{gps}$) is associated with the input variables, input set or input linguistic data which appears in the column to the right of the leftmost row. As illustrated in FIG. 8A, the input linguistic data for location quality comprises "good", "fair", and "poor", although other input variables or input linguistic data fall within the scope of the invention.

In FIG. 8A, a matrix (e.g., three by three matrix) defines various combinations or permutations (e.g., 9 possible permutations are present here) of output variables, output sets, or output linguistic data. Each combination of output variables corresponds to a respective pair of vision quality data and location quality data. The relationship or combination of input variables and corresponding output variables may be defined in a look-up table of FIG. 8A, a set of rules, a database or a data file. Where the relationships of the table of FIG. 8A are expressed as rules, each rule may be expressed as an if-then statement.

Each relationship of FIG. 8A includes the following: (1) an input linguistic data (e.g., good, poor, fair, large, medium, small) associated with input quality variables for vision quality (e.g., $Q_{vision}$), location quality (e.g., $Q_{gps}$), and curvature estimate quality (e.g., $\rho_{gps}$), (2) an output linguistic data (e.g., small, medium, and large) associated with output variables for weight factors mixing ratios (e.g., $\alpha_{off}$, $\alpha_{head}$, and $\alpha_{curv}$) and (3) a correlation, correlation value, an if-then relationship, or another logic relationship defined between the input quality variables and the output variables or between the corresponding input linguistic data and output linguistic data.

For each input set of input linguistic data in the chart of FIG. 8A, there is a corresponding output set of output linguistic data. The output linguistic data may be associated with data weight factors or mixing ratios. In one example, the data weight factors or mixing ratios include $\alpha_{off}$, $\alpha_{head}$, and $\alpha_{curv}$. The values of the input set determine the corresponding values of the output set. For example, if the vision quality (e.g., $Q_{vision}$) is "good" and the location quality (e.g., $Q_{gps}$) is "poor," $\alpha_{off}$ is equal to 1 $\alpha_{head}$ is "large" and $\alpha_{curv}$ is "large."

The relationship between the input set and the output set may be determined empirically, by field tests, experimentally, or in accordance with a model or a mathematically derived solution. The relationships between the input linguistic data and output linguistic data presented in FIG. 8A are merely illustrative, along with the selections of descriptions for the input linguistic data and output linguistic data; other relationships, selections and descriptions fall within the scope of the invention.

FIG. 8B is a chart which may be applied to step S202, which may be referred to as the fuzzy inference. Further, FIG. 8B may be applied to S300 and S302 of FIG. 5 or to S400 or S402 of FIG. 6. The chart of FIG. 8B contains a series of rules or relationships.

FIG. 8B pertains to a path plan where the path plan is generally curved or for curved portions of paths. For example, the relationships of FIG. 8B may hold where $\rho_g$ is large, or within a range that indicates a planned path or actual path (or a segment thereof) is generally curved or not generally linear. Vision quality ($Q_{vision}$) appears in the uppermost row, whereas location quality ($Q_{gps}$) (e.g., GPS quality) appears in the leftmost column. Vision quality ($Q_{vision}$) is associated with the input variables, input set or input linguistic data which appears in the row immediately underneath the uppermost row. As illustrated in FIG. 8B, the input linguistic data for vision quality comprises "good", "fair", and "poor", although other input variables or input linguistic data fall within the scope of the invention. Location quality ($Q_{gps}$) is associated with the input variables, input set or input linguistic data which appears in the column to the right of the leftmost row. As illustrated in FIG. 8B, the input linguistic data for location quality comprises "good", "fair", and "poor", although other input variables or input linguistic data fall within the scope of the invention.

In FIG. 8B, a matrix (e.g., three-by-three matrix) defines various combinations or permutations (e.g., 9 possible permutations are present here) of output variables, output sets, or output linguistic data. Each combination of output variables corresponds to a respective pair of vision quality data and location quality data. The relationship or combination of input variables and corresponding output variables may be defined in a look-up table of FIG. 8B, a set of rules, a database or a data file. Where the relationships of the table of FIG. 8B are expressed as rules, each rule may be expressed as an if-then statement.

Each relationship of FIG. 8B includes the following: (1) an input linguistic data (e.g., good, poor, fair, large, medium, small) associated with input quality variables for vision quality (e.g., $Q_{vision}$) location quality (e.g., $Q_{gps}$), and curvature estimate quality (e.g., $\rho_{gps}$), (2) an output linguistic data (e.g., small, medium, and large) associated with output variables for weight factors mixing ratios (e.g., $\alpha_{off}$, $\alpha_{head}$, and $\alpha_{curv}$), and (3) a correlation, correlation value, an if-then relationship, or another logic relationship defined between the input quality variables and the output variables or between the corresponding input linguistic data and output linguistic data.

For each input set of input linguistic data in the chart of FIG. 8B, there is a corresponding output set of output linguistic data. The output linguistic data may be associated with data weight factors or mixing ratios. In one example, the data weight factors or mixing ratios include $\alpha_{off}$, $\alpha_{head}$, and $\alpha_{curv}$. The values of the input set determine the corresponding values of the output set. For example, if the vision quality (e.g., $Q_{vision}$) is "good" and the location quality (e.g., $Q_{gps}$) is "poor," $\alpha_{off}$ is "large", $\alpha_{head}$ is "medium" and $\alpha_{curv}$ is equal to zero.

The relationship between the input set and the output set may be determined empirically, by field tests, experimentally, or in accordance with a model or a mathematically derived solution. The relationships between the input linguistic data and output linguistic data presented in FIG. 8B are merely illustrative, along with the selections of descriptions for the input linguistic data and output linguistic data; other relationships, selections and descriptions fall within the scope of the invention.

In accordance with the output linguistic data of FIG. 8A, FIG. 8B, or both; the supervisor module 10 for a vehicle generates an error control signal for steering a vehicle in accordance with the following equation: $y=\alpha \times y_{vision}+(1-\alpha)\times y_{gps}$, where y is the aggregate error control signal, $\alpha$ is the mixing ratio, $y_{vision}$ is the vision error signal and $y_{gps}$ is the location data error signal. It is understood that y, $\alpha$, $y_{vision}$ and $y_{gps}$ may be expressed as matrices. This equation may be derived from the previous equation ($y=\alpha_{vision}\times y_{vision}+\alpha_{gps}\times y_{gps}$) set forth herein by substituting $\alpha_{vision}=\alpha$ and $\alpha_{gps}=1-\alpha$. For example, y (the aggregate error control signal), a (the aggregate mixing ratio), $y_{vision}$ (the vision error signal) and $y_{gps}$ (the location error signal) may be defined as follows:

$$y = \begin{bmatrix} E_{off} \\ E_{head} \\ \rho \end{bmatrix},$$

$E_{off}$ is the aggregate off-track error from the aggregation of off-track error data (e.g., $E_{off\_gps}$ and $E_{off\_vision}$) from location module 26 and the vision module 22, $E_{head}$ is the aggregate heading error from the aggregation of the heading error data (e.g., $E_{head\_gps}$ and $E_{head\_vision}$) from the location module 26, the vision module 22 and $\rho$ is the curvature error data.

$$a = \begin{bmatrix} \alpha_{off} \\ \alpha_{head} \\ \alpha_{curv} \end{bmatrix},$$

where $\alpha$ is the aggregate mixing ratio or mixing ratio matrix, $\alpha_{off}$ is the mixing ratio for off-track error data, $\alpha_{head}$ is the mixing ratio for heading error data, and $\alpha_{curv}$ is the mixing ratio for curvature error data.

$$y_{gps} = \begin{bmatrix} E_{off\_gps} \\ E_{head\_gps} \\ \rho_{gps} \end{bmatrix},$$

where $E_{off\_gps}$ is the off-track error estimated by the location module 26 (e.g., location-determining receiver 28), $E_{head\_gps}$ is the heading error estimated by the location module 26, and $\rho_{gps}$ is the curvature estimate error associated with the location module 26.

$$y_{vision} = \begin{bmatrix} E_{off\_vision} \\ E_{head\_vision} \\ 0 \end{bmatrix},$$

where $E_{off\_vision}$ is the off track error estimated by the vision module 22 and $E_{head\_vision}$ is the heading error estimated by the vision module 22. In an alternate example, $$y_{vision} = \begin{bmatrix} E_{\text{off\_vision}} \\ E_{\text{head\_vision}} \\ \rho_{vision} \end{bmatrix},$$

where $E_{\textit{off\_vision}}$ is the off track error estimated by the vision module 22, $E_{\textit{head\_vision}}$ is the heading error estimated by the vision module 22, and $\rho_{\textit{vision}}$ is the curvature estimate associated with the vision module 22.

Figure 9:
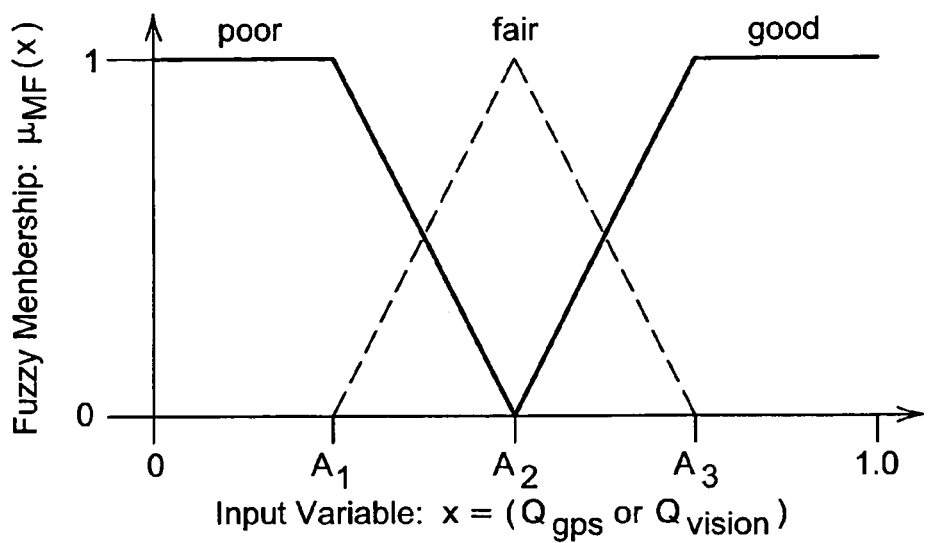
FIG. 9 is a graph of a fuzzy membership function for the vision quality data and location quality data.

FIG. 9 shows a fuzzy membership function for input variables. The horizontal axis shows the value of the input variable, whereas the vertical axis shows the value of the fuzzy membership. The input variable may comprise location quality data (e.g., $Q_{gps}$) or vision quality data ($Q_{vision}$). The input linguistic data appears to be "poor, fair and good" for the input variables. The input variables are normalized from 0 to 1. The "fair" range of the linguistic input value ranges from $A_1$ to $A_3$ for the input variable, with the range being less fair for the boundaries near or approaching $A_1$ to $A_3$ for the input variable. If the input variable is less than $A_1$, it is definitely poor. If the input variable is greater than $A_3$, it is definitely good. Between $A_1$ and $A_2$, the input variable has various levels of truth, which may be linguistically defined as poor and fair.

Figure 10:
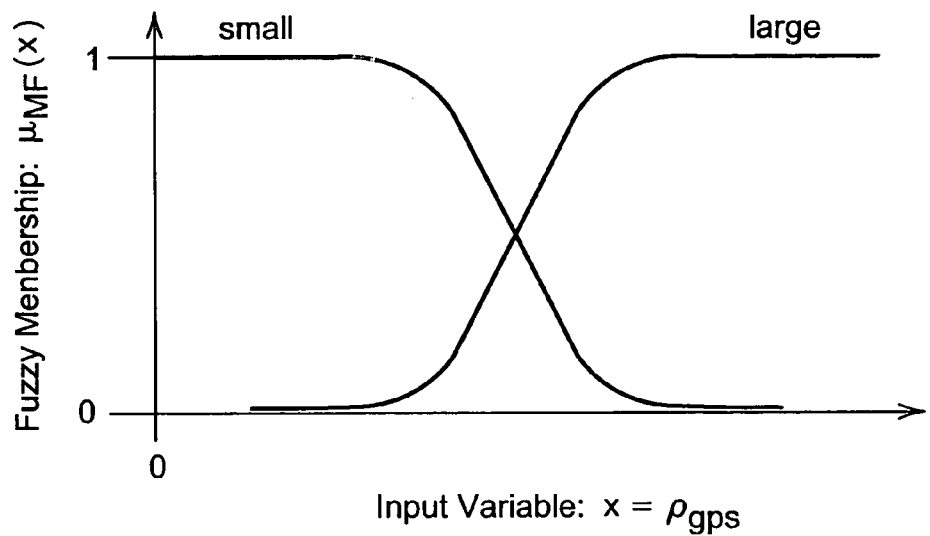
FIG. 10 is a graph of a fuzzy membership function for the curvature determined by the location-determining receiver.

FIG. 10 shows an illustrative fuzzy membership function for the curvature estimate provided by the radius of curvature calculator 30. The input linguistic data is "small and large" for the curvature estimate (e.g., $\rho_{gps}$) in FIG. 10. The horizontal axes shows the value of the input variable, whereas the vertical axis shows the value of the fuzzy membership. The input variable may be curvature estimate (e.g., $\rho_g$). The input variable values are normalized from 0 to 1.

Figure 11:
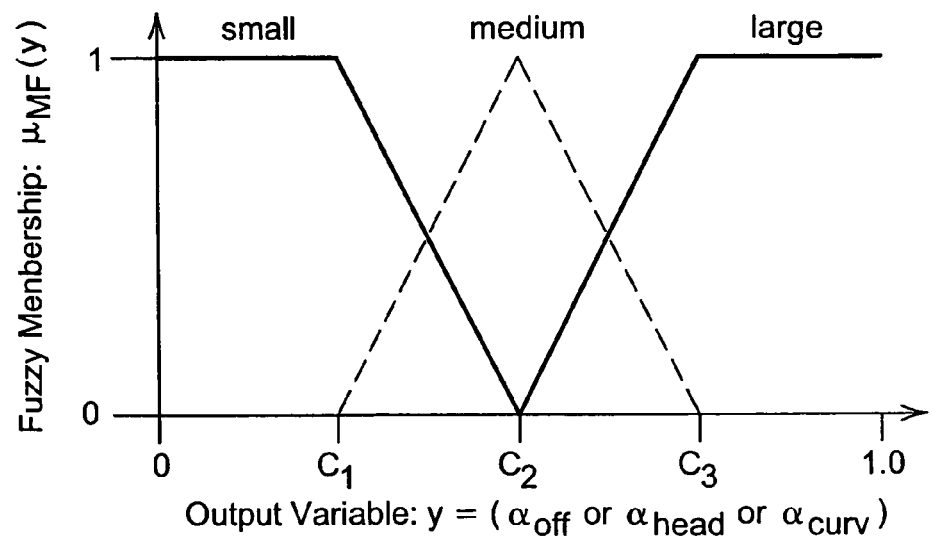
FIG. 11 is a graph of the crisp value for each mixing ratio, which is associated with a defuzzification process.

FIG. 11 shows a fuzzy membership function for output variables. The output variables may be mixing ratios or quality weights to determine the proportion of reliance on the location data versus the vision data. In one example, the output variables comprise $\alpha_{off}$, $\alpha_{head}$, or $\alpha_{curv}$. The crisp mixing ratio (e.g., C1, C2, C3, C4 or other levels intermediate or proximate thereto) may be determined from the known output linguistic values of mixing ratios $\alpha_{off}$, $\alpha_{head}$, and $\alpha_{curv}$. Each output linguistic value has a corresponding crisp mixing ratio defined by a C value or range of C values on the horizontal axis. Although the fuzzy membership functions illustrated in FIG. 9 and FIG. 11 are composed of linear elements to facilitate ready comparison of membership values, in an alternate embodiment the fuzzy membership functions may be varied in conformance with curves or polynomial equations, such as the curved portions of the fuzzy membership function of FIG. 10.

Figure 12:
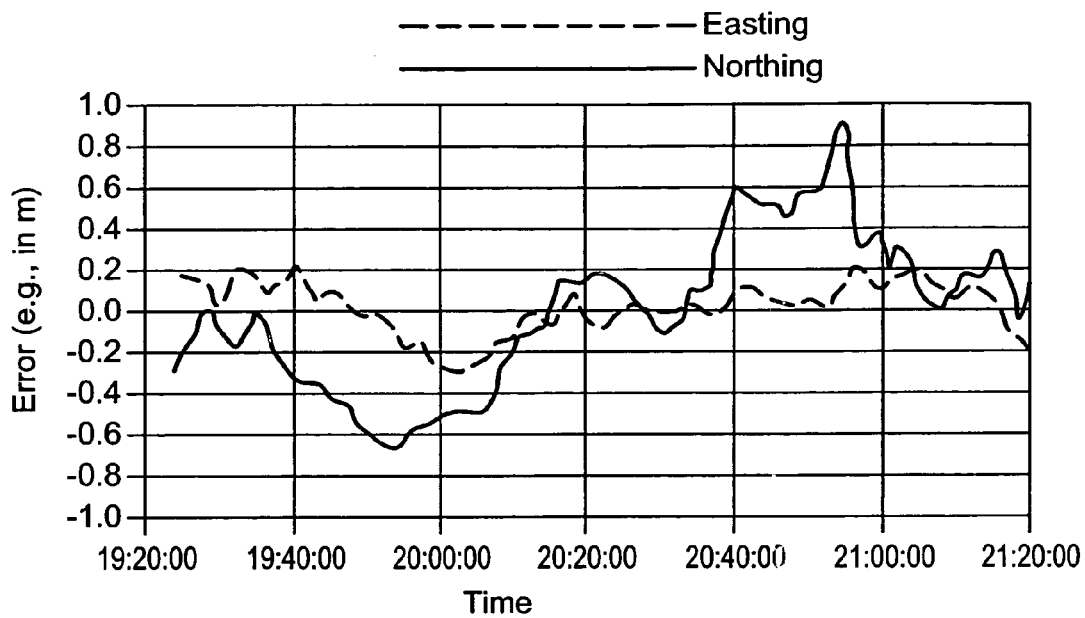
FIG. 12 is a chart that illustrates static positioning error of location data, such as a differential Global Positioning System (GPS) signal.

FIG. 12 is a chart that illustrates static positioning error of location data, such as a differential GPS signal. The vertical axis shows error in distance (e.g., meters), whereas the horizontal axis shows time (e.g., in "hours: minutes: seconds").

Figure 13:
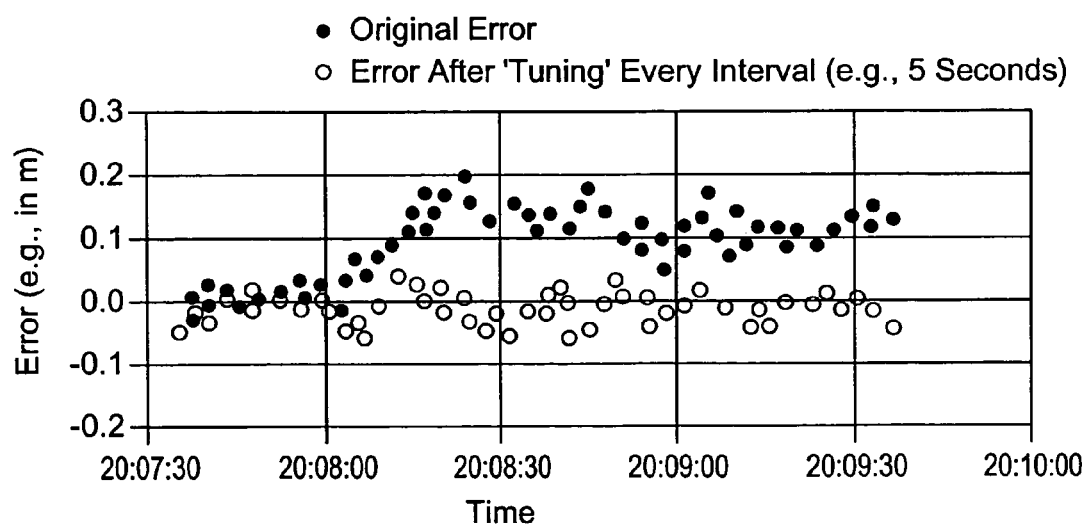
FIG. 13 is a chart that illustrates positioning error of location data, such as a differential Global Positioning System (GPS) signal after "tuning" by another sensor, such as a vision module in accordance with the invention.

FIG. 13 is a chart that illustrates dynamic positioning error of location data, such as a differential GPS signal (e.g., location data) after "tuning" at a desired update frequency or rate. The vertical axis shows error in distance (e.g., meters), whereas the horizontal axis shows time (e.g., in "hours: minutes: seconds"). FIG. 12 shows the original error without "tuning" as solid circular points and error after "tuning" as hollow circular points. The tuning achieved by using the vision data to adjust the location data at regular intervals (e.g., at 5 second intervals or 0.2 Hz as illustrated in FIG. 13).

Figure 14:
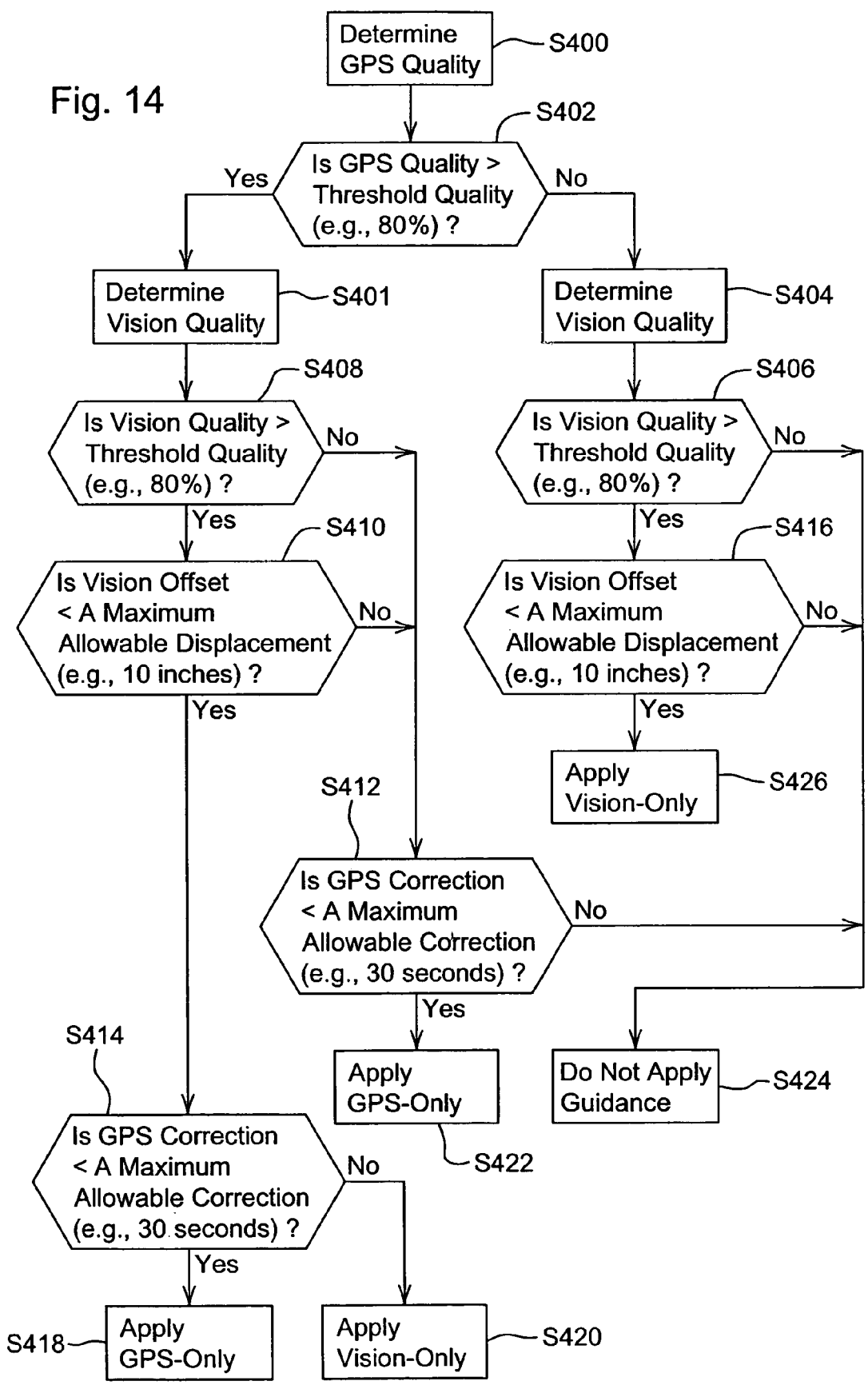
FIG. 14 is a flow chart that illustrates selection of a guidance mode for a guidance system comprising a vision module and a location-determining module.

FIG. 14 is a flow chart for a method for determining a mode of operation of a vehicular guidance system. The method facilitates determining whether a vehicle should be guided by location data only (e.g., GPS data only), vision data only, or neither vision data nor location data. The method of FIG. 14 begins in step S400.

In step S400, a location quality estimator 24 estimates location quality data for location data outputted by the location module 26 for a given time interval.

In step S402, the supervisor module 10 determines if the location quality level of the location quality data is greater than a threshold quality (e.g., 80% reliability or confidence level). If the location quality level is greater than the threshold quality, the method continues with step S401. However, if the location quality level is not greater than the threshold quality level, the method continues with step S404.

In step S401 and in step S404, the vision quality estimator 20 estimates the vision quality data for vision data outputted by the vision module 22 for a defined time interval. The defined interval may be generally coextensive with the given time interval used by the location quality estimator 24.

In step S408, the supervisor module 10 determines if the vision quality level of the vision quality data is greater than a threshold quality (e.g., 80%)? If the vision quality level is greater than the threshold quality, the method continues with step S410. However, if the vision quality level is not greater than the threshold quality level, the method continues with step S412.

In step S410, the supervisor module 10 determines if the vision offset is less than a maximum allowable displacement (e.g., 10 inches). The maximum allowable displacement may be set by a user data input, empirical studies, tests, or practical benchmarks based on environmental factors (e.g., crop selection, planting date, and date of guidance of vehicle). If the vision offset is greater than the maximum allowable displacement, the method continues with step S414. However, if the vision offset is less than or equal to a maximum allowable offset, the method continues with step S412.

In step S414, the supervisor module 10 determines if the GPS correction is less than a maximum allowable correction. The maximum allowable correction is a displacement that is based on a maximum difference (e.g., 30 seconds) between the detected vehicle position and heading (e.g., or detected coordinates) and a desired vehicle position and heading (e.g., or desired coordinates). If the GPS correction is less than a maximum allowable correction, then in step S418 the supervisor module 10 or the vehicular controller 25 applies location data (e.g., GPS data) only for guidance of the vehicle during a trailing time interval associated with the given time interval or the defined time interval. However, if the GPS correction is not less than a maximum allowable correction, then in step S420 the supervisor module 10 or the vehicular controller 25 applies only vision data for guidance of the vehicle for a trailing time interval associated with the given time interval or the defined time interval.

Step S412 may follow step S408 or step S410, as previously described herein. In step S412, the supervisor module 10 determines if the GPS correction is less than a maximum allowable correction. The maximum allowable correction is a displacement that is based on a maximum difference (e.g., 30 seconds) between the detected vehicle position and heading (e.g., or detected coordinates) and a desired vehicle position and heading (e.g., or desired coordinates). If the GPS correction is less than a maximum allowable correction, then in step S422 the supervisor module 10 or the vehicular controller 25 applies location data (e.g., GPS data) only for guidance of the vehicle during a trailing time interval associated with the given time interval or the defined time interval. However, if the GPS correction is equal to or not less than a maximum allowable correction, then in step S424 the supervisor module 10 or the vehicular controller 25 applies no guidance data from the vision module 22 or the location module 26. For example, the vehicle may revert to a manned mode, an alternate guidance system may be activated or used, or the vehicle may be stopped until a following time interval in which the vision module 22, the location module 26, or both provide more reliable output for guidance of the vehicle.

If step S404 is executed, the method may continue with step S406 after step S404. In step S406, the supervisor module 10 determines if the vision quality level of the vision quality data is greater than a threshold quality (e.g., 80%). If the vision quality level is greater than the threshold quality, the method continues with step S416. However, if the vision quality level is not greater than the threshold quality level, the method continues with step S424 in which guidance is not applied as previously described.

In step S416, the supervisor module 10 determines if the vision offset is less than a maximum allowable displacement (e.g., 10 inches). The maximum allowable displacement may be set by a user data input, empirical studies, tests, or practical benchmarks based on environmental factors (e.g., crop selection, planting date, and date of guidance of vehicle). If the vision offset is greater than the maximum allowable displacement, the method continues with step S424 in which guidance is not applied. However, if the vision offset is less than or equal to a maximum allowable offset, the method continues with step S426.

In step S426, the supervisor module 10 or the vehicular controller 25 applies vision data or vision guidance data only to guide the path of the vehicle.

Having described the preferred embodiment, it will become apparent that various modifications can be made without departing from the scope of the invention as defined in the accompanying claims.

The invention claimed is:

1. A method for guiding a vehicle, the method comprising:
   collecting location data for the vehicle based on a location-determining receiver of a location module associated with the vehicle;
   collecting vision data for the vehicle based on a vision module associated with the vehicle;
   estimating a quality of the collected location data during an evaluation time window to form location quality data;
   estimating a quality of the collected vision data during the evaluation time window to form vision quality data;
   selecting at least one of a location data weight and a vision data weight to form a selection, wherein the location data weight is based on the location quality data and the vision data weight is based on the vision quality data; and
   guiding the vehicle in accordance with the selection, wherein the selecting further comprises:
      identifying a quality-mixing ratio based on respective input values associated with the vision quality data and the location quality data;
      determining output values associated with the location data weight and the vision data weight based on the identified quality-mixing ratio; and
      applying the vision data weight and the location data weight to determine relative contributions of the collected vision data and the collected location data to a vehicular guidance system for guiding the vehicle for a time interval.

2. The method according to claim 1 wherein estimating a quality of the collected location data comprises detecting an off track error, a heading error, and a curvature associated with the location-determining receiver.

3. The method according to claim 1 wherein estimating a quality of the collected vision data comprises detecting an off track error, a heading error, and a curvature associated with the vision module.

4. The method according to claim 1 wherein the vision data weight and the location data weight are consistent with the following equation: $\alpha_{vision} + \alpha_{gps} = 1$.

5. The method according to claim 1 wherein:
   identifying the quality-mixing ratio based on respective input values associated with the vision quality data and the location quality data, comprises identifying the quality-mixing ratio based on respective input values associated with the vision quality data, the location quality data, and curvature data; wherein
   determining output values associated with the location data weight and the vision data weight based on the identified quality-mixing ratio, comprises determining output values associated with the location data weight, the vision data weight, and a curvature data weight based on the identified quality-mixing ratio; and wherein
   applying the vision data weight and the location data weight to determine relative contributions of the collected vision data and the collected location data to a vehicular guidance system for guiding the vehicle for a time interval, comprises applying the vision data weight, the location data weight, and the curvature data weight to determine relative contributions of the collected vision data and the collected location data to the vehicular guidance system for guiding the vehicle for the time interval.

6. The method according to claim 1 wherein the applying the vision data weight and the location data weight to determine relative contributions of the collected vision data and the collected location data to a vehicular guidance system for guiding the vehicle for a time interval, comprises:
   generating an error control signal for steering the vehicle in accordance with the following equations: $y = \alpha_{vision} \times y_{vision} + \alpha_{gps} \times y_{gps}$, where y is the error control signal, $\alpha_{vision}$ is the vision data weight, $y_{vision}$ is a vision error signal, $\alpha_{gps}$ is the location data weight, and $y_{gps}$ is a location error signal.

7. The method according to claim 6 wherein the y, $y_{vision}$, $y_{gps}$, $\alpha_{gps}$, and $\alpha_{vision}$ are multidimensional vectors in accordance with the following expressions:

$$y = \begin{bmatrix} E_{off} \\ E_{head} \end{bmatrix},$$

$E_{off}$ is an aggregate off-track error from an aggregation of error data from the vision module and the location module, $E_{head}$ is an aggregate heading error from the aggregation of the error data from the vision module and the location module;

$$\alpha_{vision} = \begin{bmatrix} \alpha_{off\_vision} \\ \alpha_{head\_vision} \end{bmatrix},$$

where $\alpha_{vision}$ is a vision data weight matrix, $\alpha_{off\_vision}$ is the vision data weight for off track error data, and $\alpha_{head\_vision}$ is the vision data weight for heading error data;

$$a_{gps} = \begin{bmatrix} \alpha_{off\_gps} \\ \alpha_{head\_gps} \end{bmatrix},$$

where $\alpha_{gps}$ is a location data weight matrix, $\alpha_{off\_gps}$ is the location data weight for off track error data, and $\alpha_{head\_gps}$ is the location data weight for heading error data;

$$y_{gps} = \begin{bmatrix} E_{off\_gps} \\ E_{head\_gps} \end{bmatrix},$$

where $E_{off\_gps}$ is an off-track error estimated by the location module, and $E_{head\_gps}$ is a heading error estimated by the location module; and $$y_{vision} = \begin{bmatrix} E_{off\_vision} \\ E_{head\_vision} \end{bmatrix},$$

where $E_{off\_vision}$ is an off track error estimated by the vision module and $E_{head\_vision}$ is a heading error estimated by the vision module.

8. The method according to claim 5 wherein the applying the vision data weight, the location data weight and the curvature data weight to determine relative contributions of the collected vision data and the collected location data to the vehicular guidance system for guiding the vehicle for the time interval, comprises:

generating an error control signal for steering the vehicle in accordance with the following equation: $y = \alpha_{vision} \times y_{vision} + \alpha_{gps} \times y_{gps}$, where y is the error control signal, $\alpha_{vision}$ is the vision data weight, $y_{vision}$ is a vision error signal, $\alpha_{gps}$ is the location data weight, and $y_{gps}$ is a location error signal.

9. The method according to claim 8 wherein the y, $y_{vision}$, $y_{gps}$, $\alpha_{vision}$, and $\alpha_{gps}$, are multidimensional vectors in accordance with the following expressions:

$$y = \begin{bmatrix} E_{off} \\ E_{head} \\ \rho \end{bmatrix},$$

$E_{off}$ is the aggregate off-track error from the aggregation of error data from the vision module and the location module, $E_{head}$ is the aggregate heading error from an aggregation of the error data from the vision module and the location module and $\rho$ is radius of curvature;

$$a_{vision} = \begin{bmatrix} \alpha_{off\_vision} \\ \alpha_{head\_vision} \\ \alpha_{curv\_vision} \end{bmatrix},$$

where $\alpha_{vision}$ is the aggregate vision data weight matrix, $\alpha_{off\_vision}$ is the vision data weight for off-track error data, $\alpha_{head\_vision}$ is the vision data weight for heading error data, and $\alpha_{curv\_vision}$ is vision data weight for curvature error data;

$$y_{vision} = \begin{bmatrix} E_{off\_vision} \\ E_{head\_vision} \\ 0 \end{bmatrix},$$

where $E_{off\_vision}$ is the off track error estimated by the vision module and $E_{head\_vision}$ is the heading error estimated by the vision module;

$$a_{gps} = \begin{bmatrix} \alpha_{off\_gps} \\ \alpha_{head\_gps} \\ \alpha_{curv\_gps} \end{bmatrix},$$

where $\alpha_{gps}$ is the aggregate location data weight matrix, $\alpha_{off\_gps}$ is the location data weight for off-track error data, $\alpha_{head\_gps}$ is the location data weight for heading error data, and $\alpha_{curv\_gps}$ is the location data weight for curvature error data;

$$y_{gps} = \begin{bmatrix} E_{off\_gps} \\ E_{head\_gps} \\ \rho_{gps} \end{bmatrix},$$

where $E_{off\_gps}$ is the off-track error estimated by the location module, $E_{head\_gps}$ is the heading error estimated by the location module, and $\rho_{gps}$ is radius of curvature associated with the location module.

10. A system for guiding a vehicle, the system comprising:
a location-determining receiver of location module associated with the vehicle for collecting location data for the vehicle;
a vision module associated with the vehicle for collecting vision data for the vehicle;
a location quality estimator for estimating a quality of the collected location data during an evaluation time window to form location quality data;
a vision quality estimator for estimating a quality of the collected vision data during the evaluation time window to form vision quality data; and
a selector for selecting at least one of a location data weight and a vision data weight to form a selection, wherein the location data weight is based on the location quality data and the vision data weight is based on the vision quality data; and
a vehicular guidance system for guiding the vehicle in accordance with the selection, wherein the selector selects the at least one of the location data weight and the vision data weight to form the selection by:
identifying a quality-mixing ratio based on respective input values associated with the vision quality data and the location quality data;
determining output values associated with the location data weight, and the vision data weight based on the identified quality-mixing ratio; and
applying the vision data weight and the location data weight to determine relative contributions of the collected vision data and the collected location data to the vehicular guidance system for a time interval.

11. The system according to claim 10 wherein the location quality estimator estimates the quality of the collected location data using an off-track error, a heading error, and a curvature associated with the location-determining receiver.

12. The system according to claim 10 wherein the vision quality estimator estimates the quality of the collected vision data using an off-track error, a heading error, and a curvature associated with the vision module.

13. The system according to claim 10 wherein the vision data weight and the location data weight are consistent with the following equation: $\alpha_{vision} + \alpha_{gps} = 1$.

14. The system according to claim 10 wherein the selector selects at least one of the location data weight and the vision data weight to form the selection by:
   identifying the quality-mixing ratio based on respective input values associated with the vision quality data, the location quality data, and curvature data;
   determining the output values associated with the location data weight, the vision data weight, and curvature data weight based on the identified quality-mixing ratio; and
   applying the vision data weight, the location data weight, and the curvature data weight to determine relative contributions of the collected vision data and the collected location data to the vehicular guidance system for the time interval.

15. The system according to claim 10 wherein the applying the vision data weight and the location data weight to determine relative contributions of the collected vision data and the collected location data to the vehicular guidance system for the time interval, comprises:
   generating an error control signal for steering the vehicle in accordance with the following equation: $y = \alpha_{vision} \times y_{vision} + \alpha_{gps} \times y_{gps}$, where y is the error control signal, $\alpha_{vision}$ is vision data weight, $y_{vision}$ is a vision error signal, $\alpha_{gps}$ is the location data weight, and $y_{gps}$ is a location error signal.

16. The system according to claim 15 wherein the y, $y_{vision}$, $y_{gps}$, $\alpha_{gps}$, and $\alpha_{vision}$ are multidimensional vectors in accordance with the following expressions:

$$y = \begin{bmatrix} E_{off} \\ E_{head} \end{bmatrix},$$

$E_{off}$ is the aggregate off-track error from the aggregation of error data from the vision module and the location module, $E_{head}$ is the aggregate heading error from the aggregation of the error data from the vision module and the location module;

$$\alpha_{vision} = \begin{bmatrix} \alpha_{off\_vision} \\ \alpha_{head\_vision} \end{bmatrix},$$

where $\alpha_{vision}$ is the vision data weight matrix, $\alpha_{off\_vision}$ is the vision data weight for off track error data, and $\alpha_{head\_vision}$ is the vision data weight for heading error data;

$$\alpha_{gps} = \begin{bmatrix} \alpha_{off\_gps} \\ \alpha_{head\_gps} \end{bmatrix},$$

where $\alpha_{gps}$ is the location data weight matrix, $\alpha_{off\_gps}$ is the location data weight for off track error data, and $\alpha_{head\_gps}$ is the location data weight for heading error data;

$$y_{gps} = \begin{bmatrix} E_{off\_gps} \\ E_{head\_gps} \end{bmatrix},$$

where $E_{off\_gps}$ is the off-track error estimated by the location module and $E_{head\_gps}$ is the heading error estimated by the location module; and $$y_{vision} = \begin{bmatrix} E_{off\_vision} \\ E_{head\_vision} \end{bmatrix},$$

where $E_{off\_vision}$ is the off track error estimated by the vision module and $E_{head\_vision}$ is a heading error estimated by the vision module.

17. The system according to claim 14 wherein the applying the vision data weight, the location data weight, and the curvature data weight to determine relative contributions of the collected vision data and the collected location data to the vehicular guidance system for the time interval, comprises:
   generating an error control signal for steering the vehicle in accordance with the following equation: $y = \alpha_{vision} \times y_{vision} + \alpha_{gps} \times y_{gps}$, where y is the error control signal, $\alpha_{vision}$ is the vision data weight, $y_{vision}$ is a vision error signal, $\alpha_{gps}$ is the location data weight, and $y_{gps}$ is a location error signal.

18. The system according to claim 17 wherein the y, $y_{vision}$, $y_{gps}$, $\alpha_{vision}$, and $\alpha_{gps}$ are multidimensional vectors in accordance with the following expressions:

$$y = \begin{bmatrix} E_{off} \\ E_{head} \\ \rho \end{bmatrix},$$

$E_{off}$ is the aggregate off-track error from the aggregation of error data from the vision module and the location module, $E_{head}$ is the aggregate heading error from an aggregation of the error data from the vision module and the location module and $\rho$ is radius of curvature based on the vision module and the location module;

$$\alpha_{vision} = \begin{bmatrix} \alpha_{off\_vision} \\ \alpha_{head\_vision} \\ \alpha_{curv\_vision} \end{bmatrix},$$

where $\alpha_{vision}$ is the aggregate vision data weight matrix, $\alpha_{off\_vision}$ is the vision data weight for off-track error data, $\alpha_{head\_vision}$ is the vision data weight for heading error data, and $\alpha_{curv\_vision}$ is vision data weight for curvature error data;

$$y_{vision} = \begin{bmatrix} E_{off\_vision} \\ E_{head\_vision} \\ \rho_{vision} \end{bmatrix},$$

where $E_{off\_vision}$ is the off track error estimated by the vision module and $E_{head\_vision}$ is the heading error estimated by the vision module, and $\rho_v$ is a radius of curvature associated with the vision module;

$$\alpha_{gps} = \begin{bmatrix} \alpha_{off\_gps} \\ \alpha_{head\_gps} \\ \alpha_{curv\_gps} \end{bmatrix},$$

where $\alpha_{gps}$ is the aggregate location data weight matrix, $\alpha_{off\_gps}$ is the location data weight for off-track error data, $\alpha_{head\_gps}$ is the location data weight for heading error data, and $\alpha_{curv\_gps}$ is the location data weight for curvature error data;

$$y_{gps} = \begin{bmatrix} E_{off\_gps} \\ E_{head\_gps} \\ \rho_{gps} \end{bmatrix},$$

where $E_{off\_gps}$ is the off-track error estimated by the location module, $E_{head\_gps}$ is the heading error estimated by the location module, and $\rho_{gps}$ is radius of curvature associated with the location module.

* * * * *